US010268808B2

(12) United States Patent
Lyske

(10) Patent No.: US 10,268,808 B2
(45) Date of Patent: Apr. 23, 2019

(54) ENHANCED CONTENT TRACKING SYSTEM AND METHOD

(71) Applicant: Time Machine Capital Limited, Stratford-upon-Avon (GB)

(72) Inventor: Joseph Michael William Lyske, Beckenham (GB)

(73) Assignee: Time Machine Capital Limited, Stratford-upon-Avon (GB)

(*) Notice: Subject to any disclaimer, the term of this patent is extended or adjusted under 35 U.S.C. 154(b) by 0 days.

(21) Appl. No.: 15/846,692

(22) Filed: Dec. 19, 2017

(65) Prior Publication Data

US 2018/0181730 A1    Jun. 28, 2018

(30) Foreign Application Priority Data

Dec. 20, 2016  (GB) .................................. 1621753.1
Nov. 17, 2017  (GB) .................................. 1719095.0

(51) Int. Cl.
*G06F 17/00* (2006.01)
*G06F 21/16* (2013.01)
(Continued)

(52) U.S. Cl.
CPC .............. *G06F 21/16* (2013.01); *G06F 21/10* (2013.01); *G06F 21/6209* (2013.01);
(Continued)

(58) Field of Classification Search
CPC .............. G06F 21/16; H04L 2463/101; G11B 20/0071; G11B 20/00862;
(Continued)

(56) References Cited

U.S. PATENT DOCUMENTS

| 6,476,308 B1 | 11/2002 | Zhang |
| 2002/0155416 A1 | 10/2002 | Barton |

(Continued)

FOREIGN PATENT DOCUMENTS

| EP | 2541552 A1 | 1/2013 |
| WO | 2008144530 A2 | 11/2008 |

(Continued)

OTHER PUBLICATIONS

UK Intellectual Property Office Combined Search and Examination report Under Sections 17 and 18(3) dated Jun. 8, 2017 in Application No. GB1621753.1.

(Continued)

*Primary Examiner* — Fan S Tsang
*Assistant Examiner* — David Siegel
(74) *Attorney, Agent, or Firm* — Young Law Firm, P.C.

(57) ABSTRACT

The invention, as shown by the system in FIG. 2, relates to a client-side content tracking system of media files, e.g. digital music files. Audio tracking—or indeed multimedia tracking—is shifted to a client-side perspective, with the client tasked with establishing use of a selected source audio track by tracking—and then reporting uplink to the server—at least one of: entry and exit points associated with playing of at least one of said musical sections in the identified source audio track, and how the identified source audio track was used, performed or manipulated at the client device. Server functionality is designed, having regard to the reported tracking data and its link to a unique identifier to permit the media file (e.g. source audio track) to be selected and/or identified, to store or relay—possibly in the context of a subscription service and billing regime for content use—tracking data related to use of at least a portion of the source audio track at or by the client device. In the context of audio, reporting of use at a client device can, in turn, (Continued)

cause streaming of related multi-media content from a third-party database to the client device. For music, reporting of entry and end points into and out of sections of complete audio tracks can coincide with musically seamless audio transitions between sections.

26 Claims, 13 Drawing Sheets

(51) Int. Cl.
G11B 20/00 (2006.01)
G06F 21/10 (2013.01)
G06F 21/62 (2013.01)
H04L 29/06 (2006.01)
G11B 20/10 (2006.01)

(52) U.S. Cl.
CPC ........ *G11B 20/00891* (2013.01); *H04L 63/10* (2013.01); *G06F 2221/0724* (2013.01); *G06F 2221/0733* (2013.01); *G06F 2221/0737* (2013.01); *G06F 2221/2149* (2013.01); *G11B 20/0071* (2013.01); *G11B 20/00181* (2013.01); *G11B 20/00862* (2013.01); *G11B 2020/10944* (2013.01); *H04L 2463/101* (2013.01)

(58) Field of Classification Search
CPC . G11B 20/00891; G11B 27/00; G11B 27/002; G11B 27/02; G11B 27/031; G11B 27/034; G11B 27/036; G11B 27/105
See application file for complete search history.

(56) References Cited

U.S. PATENT DOCUMENTS

| 2004/0199654 | A1 | 10/2004 | Juszkiewicz |
| 2006/0272485 | A1 | 12/2006 | Lengeling |
| 2007/0291958 | A1 | 12/2007 | Jehan |
| 2008/0127812 | A1* | 6/2008 | Sako ................. H04N 21/6547 84/625 |
| 2009/0003802 | A1 | 1/2009 | Takai et al. |
| 2009/0272253 | A1 | 11/2009 | Yamashita et al. |
| 2010/0064882 | A1* | 3/2010 | Miyajima ............ G10H 1/0025 84/625 |
| 2011/0054648 | A1 | 3/2011 | Maxwell |
| 2012/0118127 | A1 | 5/2012 | Miyajima |
| 2014/0076124 | A1 | 3/2014 | Gorges |
| 2014/0288686 | A1 | 9/2014 | Sant et al. |
| 2015/0018993 | A1 | 1/2015 | Trivedi |
| 2016/0249093 | A1 | 8/2016 | Stojancic |

FOREIGN PATENT DOCUMENTS

| WO | 2015053278 A1 | 4/2015 |
| WO | 2016207625 | 12/2016 |

OTHER PUBLICATIONS

International Search Report and Written Opinion of the International Searching Authority dated Dec. 13, 2016 in Application No. PCT/GB2016/051862.
Ruohua Zhou et al.: "Music Onset Detection Based on Resonator Time Frequency Image", IEEE Transactions on Audio, Speech and Language Processing, IEEE Service Center, New York, NY, USA, vol. 16, No. 8, Nov. 1, 2008.
Gainza Mikel: "Automatic bar line segmentation", Convention Papers, AES, 123rd Convention, 7270, Oct. 5, 2007, XP040373598.
O'Keeffe K: "Dancing Monkeys (Automated creation of step files for Dance Dance Revolution)", Internet Citation, Feb. 18, 2004, XP002359789, downloaded from http://www.imperial.ac.uk/pls/portallive/docs/1/18619749.PDF on Dec. 13, 2017.
Florent Berthaut et al.: "Advanced Synchronization of Audio or Symbolic Musical Patterns: An Algebraic Approach", Semantic Computing (ICSC), 2012 IEEE Sixth International Confernece on, IEEE, Sep. 19, 2012, ISBN 978-1-4673-4433-3.
International Search Report and Written Opinion of the International Searching Authority dated Apr. 20, 2018 in PCT/EP2017/083589.

* cited by examiner

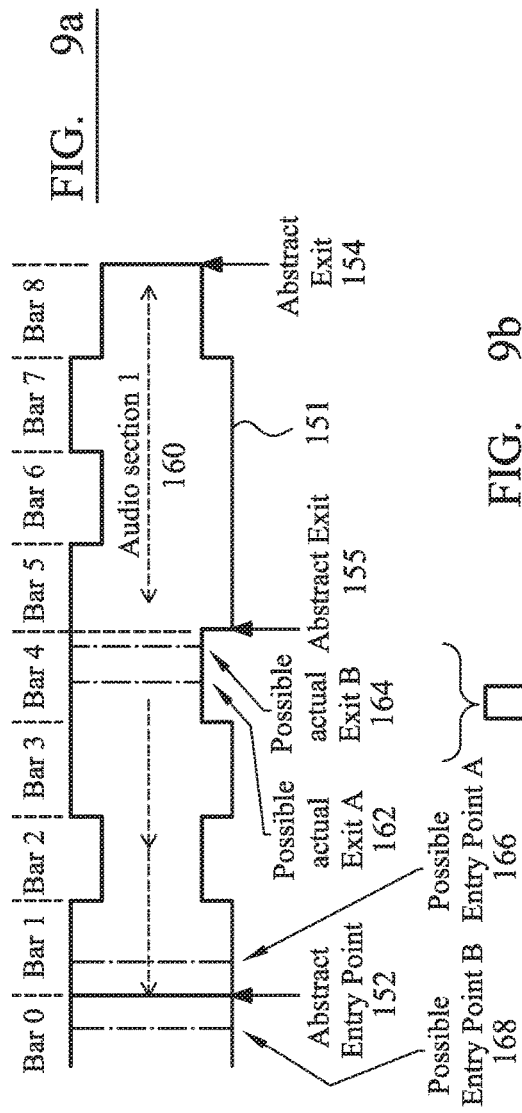
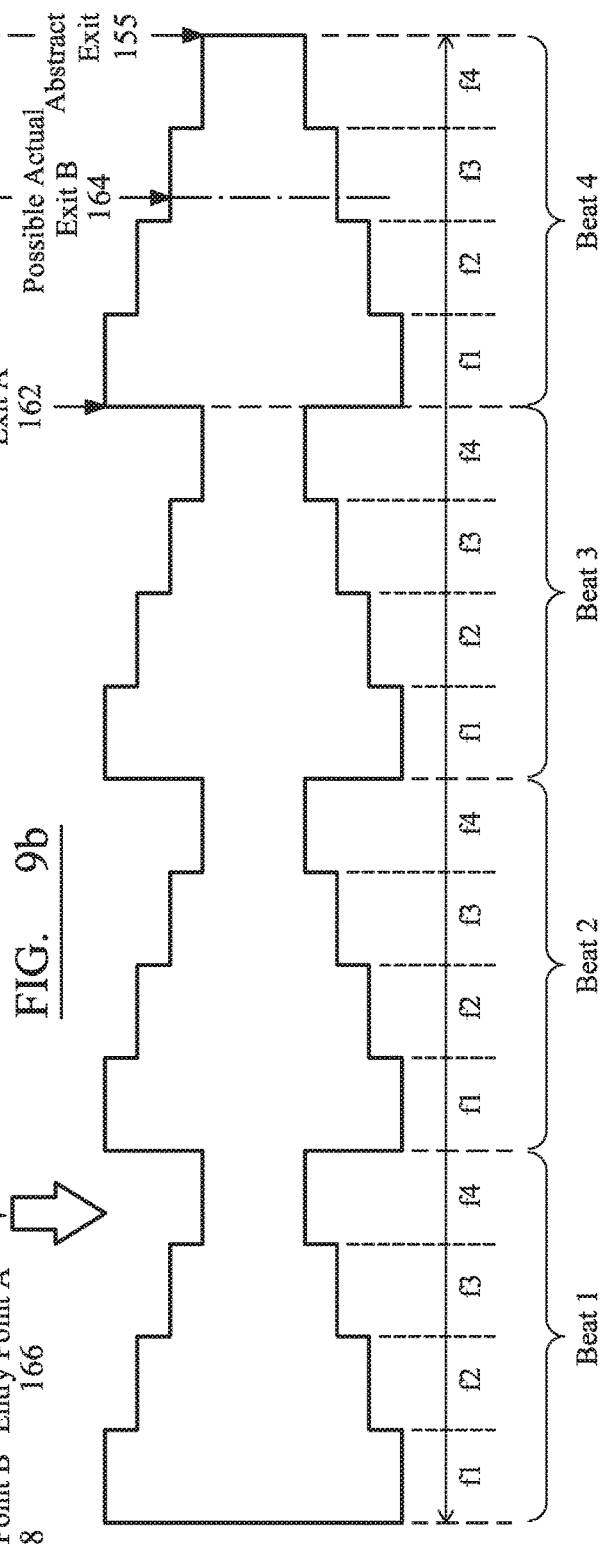
FIG. 9a
FIG. 9b

| Database | | | | | | |
|---|---|---|---|---|---|---|
| Track | Section | Description | Time Position | Entry Pt | | Exit Pt |
| 1 | 001 | Chorus | 0.15 - 0.36 | | | |
| | 010 | VERSE | 0.36 - 0.59 | | | |
| | 011 | Intro | 0.00 - 0.15 | | | |
| 2 | 001 | Chorus | 1.05 - 1.20 | | | |
| | 010 | VERSE | 1.30 - 1.48 | | | |
| | 011 | Intro | 0.00 - 0.10 | | | |
| | 001 | Chorus | 2.05 - 2.20 | | | |
| | 011 | xxx | 3.19 - 3.49 | | | |
| | 101 | OUTROW | 4.06 - 4.21 | | | |
| N | | Theme categorg 204 | Section Timing | Exit/Entry points Anacrusis Displacement (Beat + Fraction) relative to start/end of audio section | | |

FIG. 12

ENHANCED CONTENT TRACKING SYSTEM AND METHOD

BACKGROUND TO THE INVENTION

This invention relates, in general, to a content tracking system and related method. Particularly, but not exclusively, the invention relates to a system (and methodology) operative to administer control over compiled and up-loaded media clips or files intended for wider public distribution through download or streaming. More especially, the present invention relates to a system and method of monitoring and regulating access to, and then exercising control over the dissemination of, proprietary audio and/or proprietary video content identified within such uploaded media clips and/or files.

SUMMARY OF THE PRIOR ART

The music, film and gaming industry—and particularly aspects relating to the provision of content—is evolving. In this respect, the sale or distribution of (for example) music or soundtracks as either streamed or downloaded digital files is becoming dominant in those markets. This contrasts with the sale of compact disc and DVD technologies (or, historically, vinyl disks) through established, but now waning, custom retail outlets.

Unauthorized copying has always existed, predicated in the past by, for example, tape-to-tape copying of purchased physical storage media. However, ubiquitous digital storage and the ability for peer-to-peer ("P2P") file sharing have greatly diminished the level of control that can be exercised by copyright owners over copyright protected artistic works. In short, the provision and re-distribution of media content (audio, film or other visual media) through a wide-area digital domain, such as the internet, makes it relatively easy to abuse or flagrantly ignore the copyright owner's rights not least because tracking of copyright works (or excerpts of copyright works) is presently difficult and driven by processes within the infrastructure, i.e. the server-side, of a digital network.

The issue for "Labels", i.e. the owners (such as the Disney® Corporation and the Warner Music Group) of catalogues of collated copyright materials, is how to secure reasonable payment for access to and use of their protected audio and/or video content? While this issue is tinged with commercial considerations, the issue reduces to either how is it possible to implement a robust technical system that identifies and regulates the use of multimedia content by (often unauthorized) third parties or, on the flip-side of the same coin, how can the Label ensure that use of its materials, including derivative or manipulated works, be accurately tracked and reported?

The outcome of an effective technical tracking process permits the Label to assert a requirement for payment and subsequently to obtain appropriate, e.g. proportioned or full, payment for each particular use or part-use of the protected work(s).

The payment to the Label for use of media content may, in fact, furthermore be linked to applied advertising, and the identification process complicated by the mixing of selected music or video segments and then the subsequent re-editing again of those same selected and already mixed segments into further derivative compilations in which the provenance to the original work is frequently obscured or entirely lost.

To provide a context, it is perhaps worth considering the interactions between subscriber and Labels—and particularly the Label's databases—through the social-sharing platform of, for example, YouTube®. YouTube® is a free video sharing website that makes it easy to watch online videos, with the user-interface providing an ability to create and upload personally-compiled videos that can be shared with others. YouTube® itself describes its service as a forum for people to connect, inform and inspire others across the globe, with it acting as a distribution platform for original content creators and advertisers large and small.

A subscriber will create, as a media file, content which, typically, will include music that has been set to video and/or still images. The video and still images may, in fact, be uniquely generated by the subscriber using a personal video recording device or camera, but they may also be captured data from a televised event, a film or from another third-party source, including streamed data. This media file is then uploaded, across a network, by the subscriber so that it can be stored in an accessible database which itself is part of, i.e. interfaced into, a network that includes server equipment.

The network could be a wide area network "WAN", such as the world-wide web, or it may be a local area network "LAN" with a firewall that provides controlled access.

However, before storage of the created media file is generally approved and certainly before wider dissemination of the media file is permitted, a gatekeeper function [supported on, typically, an artificial intelligence "AI" platform belonging to a Label] analyses the uploaded media file to identify constituent parts of music and/or video. For example, this server-side AI undertakes appropriate content recognition and content matching by contrasting captured samples (or full tracks) of and within the media content against references data, e.g. tracks and video, stored in a further database belonging to the Label.

The Label's databases will also store a "stipulated use policy" that is set by the Label, with the policy imposes by other server-side equipment, e.g. a web-server of a content platform such as YouTube®. This stipulated use policy regulates whether the uploaded media file can be supplied and accessed by one of more third party (or "audience") subscribers who requests access to the created media file. The stipulated use policy may redact certain content or entirely deny access to the entire uploaded media file. Alternatively, the stipulated use policy may allow the media content to be shown subject to it be accompanied (or not) by on-line promotions or adverts.

Adverts displayed with the media file may, moreover, be targeted at a selected demographic or account holder, e.g. by virtue of a derived location from the account holder's logical MAC address, trying to access the stored media file. These adverts, promotions and/or public announcements may be displayed in advance of having the media file streamed downlink to a requesting audience subscriber(s)/account holder, or may be shown contemporaneously and besides the streamed media file. Moreover, each time there is a request for access to the stored media file, the web-server generates a report into the Label, which report identifies the content that is being played/displayed through access to at least a part of the stored media file.

The problems, however, are that (1) server-side content recognition does not always pick up on edited or derivative original works within the media file so these media files are never subjected to the stipulated use policy, and/or (2) the web-server fails entirely or partially to report the use, by an audience member, of the content within either a part or all of the media file or indeed any relevant use, including additional copying, of the constituent contents of the media file, and/or (3) the lack of appropriate reporting means that relevant advert generation does not occur such that the stipulated use policy is compromised.

As indicated above, any of these problems causes loss of revenue and lack of control in distribution and/or use of electronic files (whether video, audio or more generally data). Moreover, given that a stored media file may be streamed instantaneously to many thousands of devices, or otherwise streamed at random times of the day, it is simply not possible to employ a human-being to decide on each request. There would be an unacceptable delay in having to critique each request for access and/or to identify the requestor (from a large audience) and then to identify an appropriate complementary advert that satisfies the stipulated use policy. Also, it would simply be impossible for a team of individuals to assess the level or amount of a particular piece of content within the original uploaded media file or, indeed, in any derivative media extracted from that originally uploaded media file.

International Standard Recording Codes "ISRC" are an adopted industry-standard for uniquely and permanently identifying recordings. This means that the same song recorded at different times by the same artist will attract different unique ISRC codes. There are similar conventions for video, The ISRC is constructed from a two-letter country code (e.g. US for the United States of America), followed by a three-character registrant code to uniquely reflect the artist responsible for the track. A two-digit Year of Reference then follows the registrant code and a five-digit number identifies the track. This yields a unique identifier for a music track that, in an exemplary form, could be US-RTX-16-00007. Other formats are clearly possible, but the ISRC is commonplace and accepted.

SUMMARY OF THE INVENTION

According to a first aspect of the invention there is provided a method of tracking use of an audio track playable on a client device connectable into a network having a server arranged to provide controlled access to a first database in which is stored a plurality of source audio tracks comprising one or more musical sections, wherein the method comprises: making a request to the server to access an identified source audio track of the plurality of source audio tracks, the request for the identified source audio track made by the client device; providing access to the identified source audio track to the client device, said access including making available to the client device a unique identifier related to the identified source audio track; and at the client device, establishing use of the identified source audio track at the client device by tracking at least one of: entry and exit points associated with playing of at least one of said musical sections in the identified source audio track, and how the identified source audio track was used, performed or manipulated at the client device; at the client device, generating tracking data for one or both of (a) entry and exit points, and/or (b) how the identified source audio track was used, performed or manipulated at the client device; sending, to the server over the network, a report of local use of at least a portion of the selected source audio track at the client device, the report associating the tracking data with the unique identifier; at the server, having regard to the tracking data and its link to the unique identifier, storing or relaying tracking data related to use of at least a portion of the identified source audio track by the client device.

The tracking data can infer or report existence of at least one of: i) a derivative work of the identified source audio track, wherein the derivative work was assembled by processing at the client device; ii) synchronization of the identified source audio track with other media, wherein the synchronization was brought about by processing at the client device; and iii) mechanical or electronic copying of the identified source audio track at the client device wherein the copying was initiated by processing at the client device.

In an embodiment, a second database may store: associated audio file descriptions defining musically viable cross-fades or cuts between sections in each source audio track, each viable cross-fade or cut in each section defined by a point in real time corresponding to a point in musical time where an audibly seamless cross-fade maintains musical rhythm between entry and exit points of selected sections, wherein providing access to the source audio track includes at least sending an associated audio file description to the requesting client device; and the method further comprises: at the requesting client device, using the associated audio file description to identify transition points in real time for a succession of cross-fades or cuts between at least some of the sections in the source audio track each of said transition points corresponding to a point in musical time that realizes an audibly seamless transition; sending, to the server, the transition points for the identified source audio track and the unique track identifier of the source audio track; resolving, at the server, specific musical sections of the source audio track identified by the transition points and the unique track identifier to allow reporting of use of the specific musical sections.

The second database may further store an uploaded file associated with each of at least some of the plurality of source audio tracks, each uploaded file defining an edit of its respective source audio file, wherein the uploaded file allows selection of an order of sections within each source audio track when said uploaded file is read and the uploaded filed as accessible by the client device.

In another aspect of the invention there is provided a system for tracking use of a digital audio file, the system comprising: a server arranged to provide controlled access to a plurality of source digital audio files each containing at least one musical sections, wherein the server is arranged: in response to a request received from a client device for access to an identified source audio file of the plurality of source digital audio files, to provide the client device with access to the identified source audio file; to provide to the client device a unique identifier related to said identified source audio track to which access has been provided; to receive from the client device tracking data that is linked to the unique identifier, said tracking data relating to at least one of: entry and exit points associated with playing, at the client device, of at least one of said musical sections in the identified source audio track, and how the identified source audio track was used, performed or manipulated at the client device; to track use of the identified source audio track by storing or relaying the tracking data linked to the unique identifier of the identified source audio track requested by the client device, said tracking data related to use of at least a portion of the identified source audio track by the client device.

The server may be further arranged: to provide client devices with access to a database in which is stored associated audio file descriptions defining musically viable cross-fades or cuts between sections in each source audio track, each viable cross-fade or cut in each section defined by a point in real time corresponding to a point in musical time where an audibly seamless cross-fade maintains musical rhythm between entry and exit points of selected sections; to send associated audio file description to the requesting client device, the audio file description relating to the source audio track; to receive, from the client device to which the associated audio file description was sent, transition points referenced with the unique identifier of the source audio track, said transition points identify in real time a succession of cross-fades or cuts between at least some of the sections in the source audio track, each of said transition points corresponding to a point in musical time that realizes an audibly seamless transition; and to resolve specific musical sections of the source audio track identified by the transition points and the unique track identifier to allow reporting of use of the specific musical sections.

In response to resolving the specific musical section, the server (in numerous embodiments) may identify and then cause communication of targeted information to the requesting client device, the targeted information pre-identified as relevant to the source audio track or the specific musical sections.

Preferably, the transition points for the identified source audio track are stored in a database, by the server, as a representation of the edit of the source audio track.

Embodiments make the representation of the edit of the source audio track available by providing access to the transition points to client devices to allow the edit to be played. The transition points are preferably embedded as metadata in an audio track. The transition points may be real-time values, such as a pulse count within the source audio track. Other methods of reporting the transitions will be understood by the skilled addressee.

The identified source audio track (or a digital media file) can be either downloaded or streamed as a file to the requesting client device.

The tracking data can infer or report existence of at least one of: (i) a derivative work of the identified source audio track, wherein the derivative work was assembled by processing at the client device; (ii) synchronization of the identified source audio track with other media, wherein the synchronization was brought about by processing at the client device; and (iii) mechanical or electronic copying of the identified source audio track at the client device wherein the copying was initiated by processing at the client device.

In at least one embodiment, the server is further arranged to resolve a responsibility for a payment for use of the identified source audio track by at least one of: a) the client device; and b) a media server, coupled to network and the client device, with which media server the client device interacts.

The media server may be within a social media platform.

At least some sections of the source audio track may form part of a multimedia file containing at least one image synchronized for display with at least one selected section.

In a third aspect of the invention there is provided a method of playing media content on a client device and tracking use of sections of media content, the method comprising: selecting, from a database containing a multiplicity of digital media files each having one or more sections, a selected digital media file; receiving, over a communications network, access to the selected digital media file and further receiving a unique identifier related to the selected digital media file; establishing use of the selected digital media file at the client device by tracking at least one of: entry and exit points associated with playing of at least one section of the selected digital media file, and how the selected digital media file was used, performed or manipulated at the client device; generating tracking data for one or both of (a) those entry or exit points, and/or (b) how the selected digital media file was used, performed or manipulated at the client device; communicating, over the communications network, a report of local use of at least a portion of the selected digital media file at the client device, the report associating the tracking data with the unique identifier.

A preferred method of playing media content on a client device and tracking use of sections of media content further comprises: receiving an associated file description for the selected digital media file, the file description defining viable cross-fades between sections in the selected digital media file, and using the associated file description to identify transition points in real time for a succession of cross-fades between at least some selected ones of a plurality of sections in the selected digital media file; sending uplink, over the network, the transition points for the selected digital media file and the unique identifier to allow reporting of use of specific sections.

The method of playing media content on a client device and tracking use of sections of media content may further comprise: receiving an associated audio file description for the selected digital media file, the audio file description defining musically viable cross-fades between audio sections in the selected digital media file, each viable cross fade defined by a point in real time corresponding to a point in musical time where an audible seamless cross fade can be executed to maintain musical rhythm between entry and exit points within selected sections of the selected digital media file, and using the associated audio file description to identify transition points in real time for a succession of cross-fades between at least some selected ones of a plurality of audio sections in the selected digital media file, each of said transition points corresponding to a point in musical time that realizes an audibly seamless transition; and sending uplink, over the network, the transition points for the selected digital media file and the unique identifier to allow reporting of use of specific sections.

The system and methods may be arranged to restrict an ability to select sections of a source audio track to only those sections that can be cross-faded contiguously together in the edit to maintain musical rhythm between entry and exit points within musically compatible sections of the source audio track.

Accessing an edited version of the source audio track can be through a server acting as a gatekeeper to a data repository; and playing the edited version may need access, via the server, to stored metadata associated with the edit, wherein the metadata defines transition points to allow the edited version to be played on the client device.

In yet another aspect of the invention there is a computer program product that, when executed by a processor of a client device, causes the client device to perform the steps of the methods as explained herein In one particular embodiment there is provided a method of tracking use of musical sections of an audio track playable on client devices connectable into a network having a server arranged to provide controlled access to at least one database in which is stored: a plurality of source audio tracks containing a plurality of sections, associated audio file descriptions defining musically viable cross-fades between sections in each source audio track, each viable cross fade in each section defined by a point in real time corresponding to a point in musical time where an audibly seamless cross-fade maintains musical rhythm between entry and exit points of selected sections, and an uploaded file associated with each of at least some of the plurality of source audio tracks, each uploaded file defining an edit of its respective source audio file, wherein the uploaded file allows selection of an order of sections within each source audio track when said uploaded file is read, wherein the method comprises: making a request to the server to access an identified source audio track, the request made by a requesting client device; providing access to the source audio track to the requesting client device and at least sending an associated audio file description to the requesting client device; and at the requesting client device, using the associated audio file description to identify transition points in real time for a succession of cross-fades between at least some of the sections in the source audio track, each of said transition points corresponding to a point in musical time that realizes an audibly seamless transition; sending, to the server, the transition points for the identified source audio track and a unique track identifier of the source audio track; resolving, at the server, specific musical sections of the source audio track identified by the transition points and the unique track identifier to allow reporting of use of the specific musical sections.

An embodiment of a system for tracking use of musical sections of an audio track see a system in which: a server is arranged to provide controlled access to at least one database in which is stored a plurality of source audio tracks containing a plurality of sections, associated audio file descriptions defining musically viable cross-fades between sections in each source audio track, each viable cross fade in each section defined by a point in real time corresponding to a point in musical time where an audibly seamless cross fade maintains musical rhythm between entry and exit points of selected sections, and an uploaded file associated with each of at least some of the plurality of source audio tracks, each metadata file defining an edit of its respective source audio file, wherein the metadata file allows selection of an order of sections within each source audio track when the metadata file is read, wherein the server is arranged to: provide access to a user-identified source audio track of the plurality of source audio tracks; send downstream to an identified user device at least an audio file description related to the user-identified source audio track and a unique identifier for said source audio track; receive from the identified user device i) transition points in real time for a succession of cross-fades between at least some sections in the source audio track to which access has been granted to the identified user device, each of said transition points corresponding to a point in musical time that realizes said audibly seamless transition between sections, and ii) the unique track identifier; resolve specific musical sections of the source audio track identified by the transition points and the unique track identifier to allow reporting of use of the specific musical sections.

In yet another embodiment a method of playing an audio track on a client device and tracking use of musical sections of that audio track comprises: selecting, from a database, a source audio track having a plurality of sections; receiving an associated audio file description for the selected audio track, the audio file description defining musically viable cross-fades between sections in the source audio track, each viable cross fade defined by a point in real time corresponding to a point in musical time where an audible seamless cross fade can be executed to maintain musical rhythm between entry and exit points within selected sections of the selected audio track, and using the associated audio file description to identify transition points in real time for a succession of cross-fades between at least some selected ones of the plurality of sections in the source audio track, each of said transition points corresponding to a point in musical time that realizes an audibly seamless transition; sending to a server, coupled to the device over a network, the transition points for the identified source audio track and a unique track identifier of the source audio track to allow reporting of use of the specific musical sections.

Aspects of the method can be implemented as computer program products executable by processors at the client device and the server.

Advantageously, the present invention provides a client-side mechanism to track media content, especially audio content (although its principles can be applied to track other forms of media in the digital domain), through use of metadata that maintains the relationship between constituent elements of an audio track (or the like) and the original source file regardless of the number of edits and re-arrangements of those constituent elements. Embodiments of the present invention allow for editing of an audio file in an audibly seamless fashion in which cross-fades between initially non-contiguous sections, i.e. different sampled slices, is supported through the initial supply of an audio file description that parses each musically meaningful audio section into both musical time and real-time characteristics (both of which are required to achieve the audibly seamless cross-fade). By embedding real-time cut transition data defining cross-fading relative to the original file that was adapted, a device playing the edited file can uplink a report based on use of the specific constituent (audio) sections. This report is then used on the server-side to generate a further report concerning content tracking, which further report can be sent to a commercial server that functions to administer a licensing program based on reported tracked events and/or causes the serving of section-related auxiliary media content to the device from which the uplink report was sent. Beneficially, the increased finer granularity associated with being able to identify expressly specific uses of specific sections of audio (and/or video, as the case may be) allows the system of the present invention to award revenue sharing proportionally to the different sections of the assembled and played media file. The present invention therefore simplifies the infrastructure associated with content tracking from the existing server-orientated solution, and provides increasing robustness in that content reporting is improved with the increased ability to catch and report use (even when such use follows an edit-of-an-edit situation that formally led to loss of relevant information on the provenance of the used section of audio.

BRIEF DESCRIPTION OF THE DRAWINGS

Exemplary embodiments of the present invention will now be described with reference to the accompanying drawings in which:

FIG. 12 is an exemplary configuration of a track database in accordance with a preferred embodiment.

DETAILED DESCRIPTION OF A PREFERRED EMBODIMENT

Figure 1:
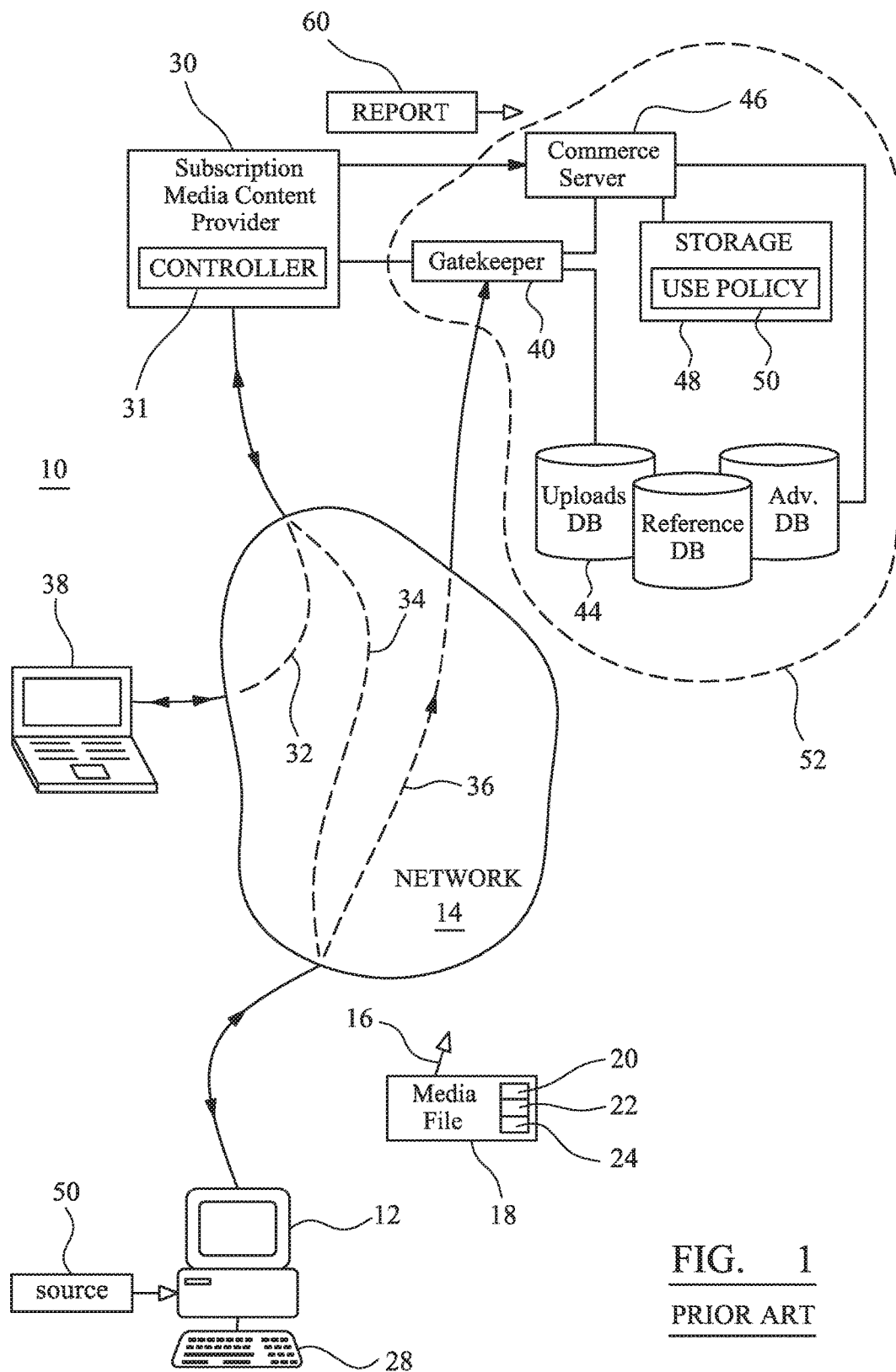
FIG. 1 is a schematic representation of a conventional media sharing system.

FIG. 1 is a schematic representation of a conventional media sharing system 10.

In FIG. 1, a user makes use of a computer 12 (or the like, such as a smartphone or PDA) to construct and then upload 16, over a network 14, a media file 18. The media file contains content 20 typically in the form of at least one of audio 22 and/or images 24, including still images and/or video. The images 24 may be input into the computer from a local source 26, such as a video camera or the like and can be subjected to some form of editing application 28 that is web-based or locally installed on the computer 12. With respect to audio for the media file, this may be obtained locally or can be acquired from accessing a remote data repository or database and then streaming the materials to permit local editing. The derivation of the components parts of the media file 18, in this instance, is unimportant and suffice to say that the media file 18 contains data—which may be samples/portions of a full audio track or video clips rather than a completely intact original artistic work—that the user wishes to publish through some form of channel supported by a subscription media content provider 30. Again, it is not important whether the content provider 30 requires a paid or unpaid subscription, although in either case the user will typically have some form of registration as will be readily appreciated given that content providers, such as YouTube® are well understood. Typically, the subscription media content provider 30 will be a server and related databases, with the server having some appropriate interface and operational control logic (collectively represented by the controller module 31). Accessible databases may be local to or remote from the subscription media content provider 30.

As to the nature of the network 14, this could be any one or a mixture of a WAN, LAN, PLMN or a wired public network and may extend more widely such that databases are accessed through the network 14. The network 14 merely provides on-demand communication paths and circuits 32-36 that permit interconnection and interaction of the various pieces of infrastructure and subscriber equipment, such as the computer 12 used to generate the media file 18 and a plurality of subscriber or audience equipment, such as exemplified by laptop 38, that wish to download, stream or otherwise listen to or watch part or all the uploaded media files 18 that has been assembled by the user.

Assuming now that the media file 18 has been assembled by the user at the computer 12 and addressed towards the subscription media content provider 30, media file is subjected to interrogation to identify its suitability of storage and wider third-party access by the audience 38. In this respect, a server-side gatekeeping function 40 (typically based on artificial intelligence) is invoked by the subscription media content provider 30. The gatekeeping function 40 may be within the subscription media content provider 30 or located on an external server belonging to a different commercial entity, such as the aforesaid Label. The gatekeeper function 40 is arranged to perform content recognition/content matching of constituent parts (or the entirety) of the uploaded media file, and then contributes to a decision about whether (and to what extent) the—and indeed each—uploaded media file 18 can be stored and how part, or all, of each uploaded media file 18 can be viewed or accessed. In this regard, the gatekeeper function 40 is coupled to both the subscription media content provider 30 and a centralised or distributed database 44 in which is stored: i) a multiplicity of uploaded and different media files; ii) a reference database of original audio tracks and/or video and/or still images; and iii) an advert database containing advert or promotional content that, typically, is cross-referenced to individuals or groups based on demographic and/or address data, Gatekeeper function 40 may also be coupled to a commerce server 46 which, in turn, is communication with the subscription media content provider 30, the centralized or distributed databases 44 and some form of accessible memory 58 that includes a set of rules, i.e. a stipulated use policy 50, defining who and if uploaded media files are to be viewed. The stipulated use policy 50 is set, typically, by the Label (generally and typically represented by some or all the functions enclosed by dashed line 52).

Returning to the gatekeeper function 40, an uploaded media file 18 is critiqued and categorized through comparison of its entirety or constituent parts of the media file with pre-stored reference materials relating to the original artistic work(s). Such comparison techniques are well-known and do not need to be described in detail since they are only relevant to the context of how conventional systems works. In short, however, the gatekeeper function 40 essentially looks for similarities and the amount of differences between analysed sections of each uploaded media file 18 and reference data. A determination is then made as to how an uploaded media file is to be referenced (relative to original artistic works determined to be relevant) and how access to the uploaded media filed is to be controlled, e.g. whether any of its content is shown with or without access to identified or complementary adverts (stored in the advert database) or whether its content is to be redacted or entirely supressed. The stipulated use policy 50 is therefore a Label-definable policy and a policy that serves to generate revenue for the label based on subsequent access to each [stored] uploaded media file 18.

In terms of access, FIG. 1 shows a third-party terminal, such as laptop 38, connected through the network 14 to the subscription media content provider 30. There will, of course, be many third-party terminals connected to the system from time-to-time. In use, the third-party terminal will be operated by a user who will input an address or otherwise search for a media file uploaded into and now approved and stored in database 44. The subscription media content provider 30 will administer the request for access and supply a path to the requested (stored) media file to permit manipulation and/or viewing of the media file at the third-party terminal. The path may be a direct point-to-point connection but is usually indirect, i.e. via the subscription media content provider 30. At the point when access to the media file is requested or otherwise when streaming or downloading of the media file to the third-party terminal is taking place, a report 60 is generated by the server-side system, which report 60 is communicated to the commerce server 46. Also, substantially simultaneously with the playing or downloading of the requested media file, the stipulated use policy associated with the uploaded and stored media file 18 is instantiated and applied to cause an appropriate advert to be communicated (or a redaction applied) to the download to the viewing of the media file at the third-party terminal. The report 60 permits an event log to be incremented for use of the original artistic work, and a payment of a licence fee for use of the original artistic work to be imposed on one or other of the subscription media content provider 30 or the user of the third party-terminal. It may simply be that the recorded cross-referencing between the uploaded data file 18 and both the original artistic work and the stipulated use policy automatically cause any appropriate advert to be communicated downlink to the third-party terminal, and that accessing the database causes the report 60 to be recorded (in storage 48) by the commerce server 46 for immediate or cumulative-event invoicing purposes.

FIG. 1 therefore shows server-side content identification and tracking, and its system configuration susceptible to errors in omission or unrecorded reporting as described above.

I. Content Tracking

In contrast, the present invention employs a client-centric approach to track identification. The system configuration of FIG. 2 shares some similarities to that of FIG. 1, although there is a significant simplification of the tracking and reporting protocols and a related simplification in infrastructure components, track characterization and reporting complexity. Topology of the network 14 permits the various modules and components of the system to interact and be in data connection, with this meaning that, from the infrastructure side, the components can be physically distributed with interconnections showing typical buy exemplary functional connectivity.

Figure 2:
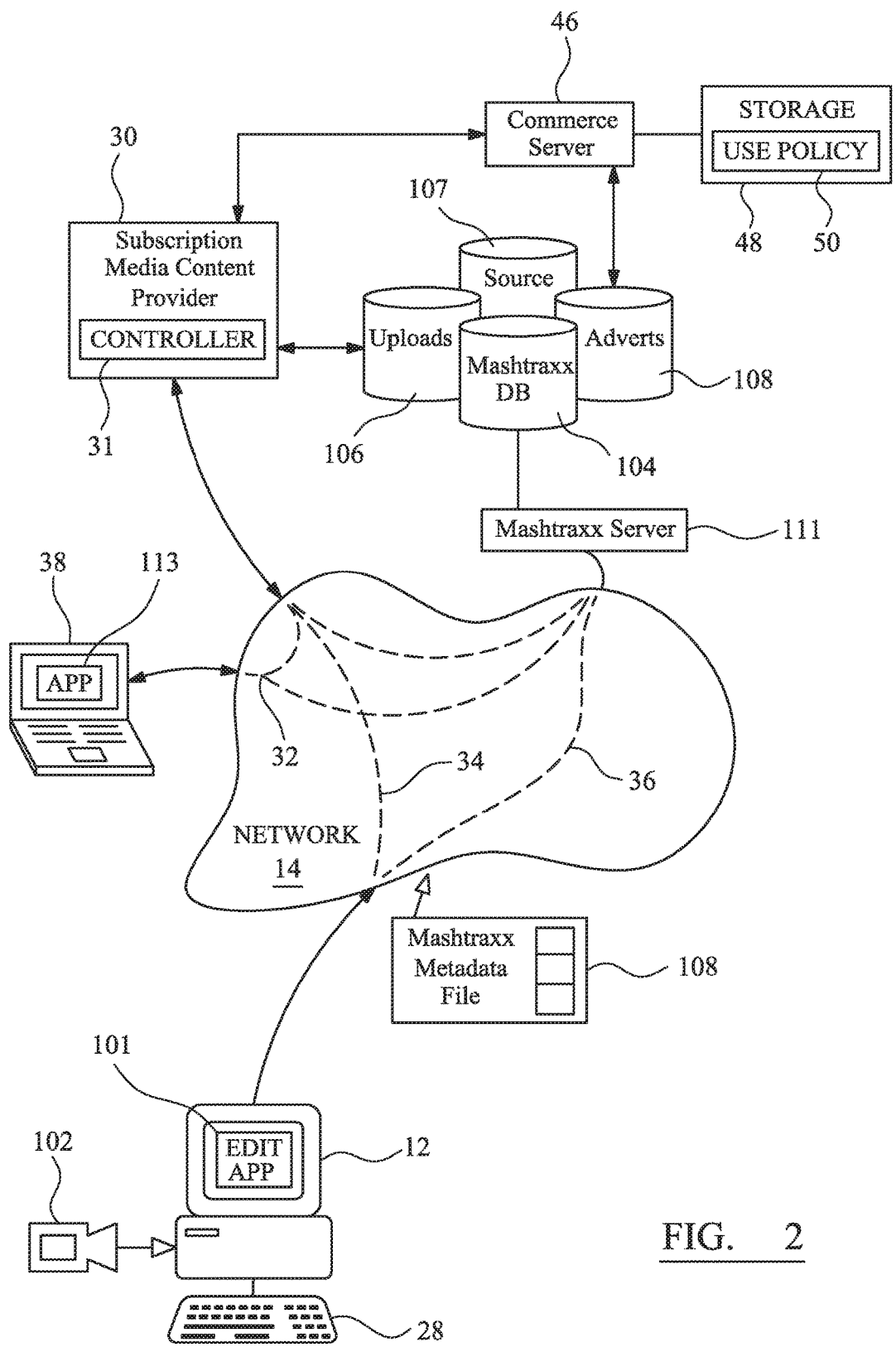
FIG. 2 is a schematic representation of a content assembly, delivery and tracking system of a preferred embodiment.

In FIG. 2, the user of the computer 12 can still edit 28 content to assemble and generate a media file, but the content is potentially sourced differently from, for example, a local video camera 102 or other image library (which may be remote and on-line) whilst the audio tracks are requested and downloaded from a Mashtraxx database 104. Mashtraxx audio tracks—which are stored on the Mashtraxx database 104—include metadata relating to beat transition points that are suitable for both cutting into and cutting out off the track, and this metadata allows a Mashtraxx system to seamlessly re-order and marry tracks having common musical characteristics together. The nature of the metadata is discussed in more detail below and is described in detail in PCT/GB2016/051862 which is incorporated herein by reference and in its entirety. Mashtraxx metadata is related to each contiguous section of an audio track and provides a unique and permanent identifier for each audio section in each audio track. Each section is therefore independently traceable through its unique and permanent identifier no matter how it is used or manipulated since the metadata is permanently associated with the section, and a reference database within the system maintains a record of each unique and permanent identifier. Assembly of a Mashtraxx media file containing any audio will therefore always include a record of the origin of the Mashtraxx audio section, irrespective of whether the audio section is extracted from a copy of a copy. In other words, derivative works containing aspects of the original Mashtraxx audio (and related metadata) continue to be uniquely identifiable and, moreover, their specific uses can be tracked and reported.

In this context, "section" means a single piece or sample of audio that cannot be split into a shorter length (in musical time) without compromising a seamless joining to another audio section that achieves no user-perceivable change to an underlying musical beat or rhythm inherent to the first audio section. Of course, sections can be made of any length and these lengths are set at the option of the annotator of the source audio track, but regardless sections have a musical sense and properties that allow for entry and exit into and out of each section during a cross-fade. The term "Mashtraxx metadata file" can therefore relate, depending upon embodiment, to augmented Mashtraxx metadata that defines in time the concatenation and re-ordering of audio sections in at least one audio track, but the term can also relate to a composite file that contains both embedded Mashtraxx metadata in combination with one or both of an associated edited audio track or an edited multimedia image and audio track edit. A Mashtraxx metadata file may therefore take one of two alternative forms depending upon whether the metadata is communicated downlink (i.e. for potential editing or play purpose of an audio track when the metadata is "an audio file description") or uplink where there is reporting of playing of the audio track and/or a description of an edit of the source audio file.

Returning to FIG. 2, the user (typically) acquires a source audio track from either a Label's proprietary database 107, e.g. iTunes, belonging to or administered by a Label or otherwise from a Mashtraxx music edit and access database (shown in FIG. 2 as Mashtraxx database 104 and uploads database 106) that has itself acquired the original audio track from the Label. The location of the Label's proprietary database is not important and, in fact, it could be part of the Mashtraxx music edit and access database 104-106. The reason behind the initial download of the source audio is simply to allow the user to identify a track of interest. This identification may involve audio recognition through playing of the original track and/or through searching for applied industry-standard metadata in the form of a unique identifying ISRC incorporated or associated with any audio track. Of course, the user could, in fact, go directly to the dedicated music database and download (or otherwise stream) a derivative work, but it will be understood that the derivate "edit" could potentially be misrecognized since it would have a musical arrangement different to the original source audio track. Therefore, it may be preferable to start the edit process with the original source audio track, although this is entirely optional and an "edit of an edit" is contemplated by the embodiments of the present invention.

The source track may also subsequently be used in an edit process.

A Mashtraxx editing app 101 installed on a user's computer, smartphone or the like provides an interface for a user to permit access to at least one of the source audio track and the Mashtraxx music edit and access database. The editing app 101 may, furthermore, be accessed through a web-browser, so specific software on the user's computer may be not be required and the editing app 101 therefore transitory. The editing app 101 also permits the uploading to data, which may be a composite media file with associated augmented Mashtraxx metadata, but alternatively the upload could be just an augmented Mashtraxx metadata file or a reporting "log" of relevant locally-occurring events that is permanently associated with a source audio track or a compiled media file supporting at least a segmented rearrangement of the source audio file or an audio-video compilation.

A) Audio File Description

Assuming, for the sake of explanation only, that the objective is a first edit of a source audio track, rather than a re-edit of a current edit (which is also supported by the embodiments of the invention). The Mashtraxx editing app 101 sends a request to a Mashtraxx server 111 to supply, by return, at least an audio file description for the selected source audio file. The audio file description includes a full definition of how sections within the source track can be cross-faded together in a seamless fashion, with the description therefore including details of how each identified section of a source track can be defined both in terms of musical time and real time. A definition in music time is required to explain what can be mashed/cut together without causing a musically-discernible shock to a listener, whereas the definition in real time precisely identifies when, in the digital processing domain, the cut actually must happen (relative to the sampling rate space of pulses within a musical bar). These two different time measures are required because music time includes semantics that are not commutable into a real-time representation. Additionally, the audio file description can include ancillary information, such as sub-file names, and subjective assessment information applied to help categorize a particular section (or "slice") of music relative to other slices of music in the same track. For example, a track may include an intro, multiple choruses, multiple verses and an outro, with there existing a relative musical significance (or "intensity") between the intro and each of the outro, chorus (or choruses) and verse or verses and, indeed, a relative intensity between verses and choruses (amongst other identifiable musical sections). Moreover, within a common theme, for example, of choruses it is possible for one chorus to be perceived to have a relative higher musical significance to another, identically-worded time-displaced chorus, so a finer level of distinction between common themes may be defined within the structure of the audio file description.

The audio file description, when applied to its related source track, permits the source track to be sectorized (or "segmented") for editing and re-combination purposes. The audio file description, i.e. the metadata ascribed to each section of a track, therefore defines where and how sections of a track can be re-assembled in a different order and in such as fashion that there is no or substantially no musical (audio) jarring.

With respect to the audio file description, each track is segmented into sections each having defined relative musical intensities or themes, e.g. intro, chorus, verse, outro, etc. Such segmentation or sectorization is effectively a high-level characterization of component parts of each audio track. In fact, each of the verses, choruses, intro and outro may—and in fact generally are—themselves partitionable from the perspective of a musical into smaller sections that can be subsequently reknitted together and tracked using the techniques herein described. Issues addressed by the totality of the present disclosure include how to cut and re-join time-separated sections in an efficient and seamless manner. The preferred characterization of each track therefore will partition each track into the smallest possible sections—or in a practical embodiment a section that is musically meaningful to the annotator—with this partitioning achieved either manually (in the case of a human annotator) or with applied artificial intelligence (where applied rules of the processing will determine the section lengths).

The audio file description of each track therefore includes at least some, and typically all of, the following:

1. A dictionary of "slice", i.e. "section" details that lists all the slices within an identified track.

2. For each slice for an identified track, a "cross_fade_duration" that is a numerical value based on the sampling rate. The cross_fade_duration is variable and relates to the time that is used to fade from a first section or a different, user-selected section of (generally) the same track. It is noted that the cross_fade_duration is selected by the system administrator when the track is categorized, with the duration selected to reflect the changing audible cross-fade requirements between different genres of music. For example, in pop music, a typical cross fade may occur over 3 milliseconds at a nominal sampling rate of forth-four thousand one hundred (44100) samples per second. Conversely, fading between sections in classical music generally occurs over a significantly longer time relative to that in pop music, otherwise the cut is easily audibly perceivable.

3. For each section/slice (which may, for manipulation purposes, be provided with a name string), timing characteristics that define the section/slice in both musical time and actual time are presented in assigned fields populated by examination of the source audio track. More particularly, such fields include:

a. "sample_start": represented as an integer value that defines, in real time and in accordance with the sampling rate, the precise start point of a slice. For example, this might be sample number twenty-seven thousand, six hundred and three (27,603).

b. "sample duration": represented as a numeric value that defines the total number of samples in a specific slice, e.g. one hundred and ninety-two thousand, four hundred and fifty which corresponds, at a sampling rate of 44,100, to four thousand, three-hundred and sixty-three point nine (4363.9) milliseconds in actual time. This is actually an optional field and implementation specific since the information is also present elsewhere within the metadata, namely within the "length" parameter.

c. "position": defined in terms of bars and thus in terms of "beats", "fractions", "pulses" and "tempo". "Position" is a description in musical time that provides a contextual musical start point rather than the abstract numerical value" of "sample_start" in the real-time line. The use of "position" therefore defines what, in a seamless audio sense, can be jointed end-to-end, with the use of beats, bars and fractions compensating for the nature and origin of the source of the original audio track. For example, if a track is added to the Mashtraxx database and that track was acquired from iTunes (rather than the music repository Tidal), then a position in real time for an event may not correspond. Conversely, defining the same event in terms of music time (i.e. bars, beats and fractions) permits synchronization and the production of a common time base that permits source tracks assembled with by different annotators and/or with different sampling rates. In other words, two different database repositories can have two different audio files for the nominally the same recording. The position parameter therefore compensates for these timing differences to effectively align the bars, beats and fractions.

d. "length": a musical time representation corresponding to sample_duration and a definition of what can in fact be cut musically, rather than just where ("sample_duration") the cut needs to be made. Length is a critical factor and defines the transition in musical time of a cut event defined by bars, beats and fractions. From an implementation perspective, bars and beats are therefore each integer values, whilst fractions are a floating-point number. "Length" is also preferably defined in terms of the time domain and absolute time, with position expressed in terms of a total number of related pulses. For example, for processing purposes, a bar might be set to have, say, 576 sub-divisions (termed "pulses") in the understanding that the duration of a bar will, in fact, change in length in real-time based on the fact that an audio track may change time signatures and this means that editing between sections may also require this change in time signature to be taken into account. A pulse can therefore be considered to be the lowest time-reference common denominator that can represent a beat or faction in common or compound musical time. "Length" is therefore significant because it allows the cross-fade/edit to occur between compatible sections, since any edit must happen at a point of musical sense and in musical time. In musical time, bars, beats and fractions therefore contain semantic information that is lost in any absolute measure of time, e.g. sample_duration. From a preferred implementation perspective, pulses are (like bars and beats) integer values. "Length" preferably includes a measure, in real-time, called length_in_samples, with this being real-time numbers that are a function of product of the number of pulses and both the time signature and tempo of the section of music. "Length" is therefore a musical time representation of duration. "Length" is an attribute of each section/slice, but also an attribute of each anacrusis and exit point (see below). Representation of durations in musical time, as oppose to in terms of 'samples', is crucial to determining where edits can be made. "Length" is therefore applicable to the description of multiple attributes in each musical section, with these attributes including sections, anacruses and exit points.

e. "anacrusis_list": For each section, there will be at least one anacrusis, with each anacrusis itself defined by a length (see above), a "sample_offset" and a "anacrusis_cross_fade_duration". The sample offset is an integer value of the sampling rate and reflects a time offset as an integer value of samples between the anacrusis and a selected musical position (being the abstract entry/exit points shown later in FIGS. 7 and 9). Anacrusis_cross_fade_duration is an integer value of samples and reflects an over-ride position related to a specific cross-fade for a specific anacrusis, so anacrusis_cross_fade_duration substitutes for a generally set cross_fade_duration attached to a particular music genre.

f. "exit_point_list": For each section, there will be at least one exit point, as described subsequently with reference to FIG. 9. Again, each exit point is described in terms of the "length" parameter in musical time. As will be described subsequently, a section may have many possible exit points (i.e. anacruses) for cross-fading, but the musical length of an exit anacrusis must match the length of the anacrusis to be used as the next entry point into a time-displaced slice. For the cut, a length is preferable relative to a transition based on pulse count since semantic musical information is present within the length but not an absolute number associated with a pulse.

g. "slice_intensity": This is actually a subjective value, as described above, assignable by a music engineer (or AI) responsible for assembling the audio file description. As indicated, it typically an integer value between 1 and, say, 7 that can be used to trace/identify aspects or themes of sections within context of an overall track. Ancillary data associated with the slice_intensity may include a colour value that permits the software to represent different sections, i.e. different intensities, within a waveform representation of the audio to be represented in different colours, but for compatible cross-fade sections of the audio to be shown in colour (rather than just as a black-and-white outline waveform). Of course, other visual identification schemes can be used. For example, the sections $T_1$, $T_2$ and $T_4$ of the waveform of FIG. 3 could be shown in two or more different colours to reflect changing aspects of the audio track, whilst re-ordering of section $T_3$ might could remove the option subsequently to fade into section $T_2$ even though $T_2$, in the original track, preceded $T_3$. This would result in section $T_2$ from being de-emphasised, e.g. any previous applied colour removed, as a consequence of its effective de-selection as a fade option.

h. "free-form properties": realised by one or more ancillary fields arranged to store metadata that can serve to identify musical or instrumental functions or otherwise to align an edited audio file with supplementary video data. Typically, these fields represent precise timing entry points and so they are each an integer pointing to a specific sample to which, for example, a start point of a video (or the like) can be attached and triggered.

Other information may be included, optionally, in the audio file description, such as canonical track details and time signature data.

The audio file description is therefore a structured data store that contains all the data necessary to re-edit a canonical audio track. The audio file description may therefore be exported as, for example, JSON file, although other encoding schemes are also equally viable.

Before considering in more detail the process by which content tracking, according to the invention and its various embodiments is performed, by way of summary the skilled address will understand that each audio file description contains applied annotated details for each section or slice of a music track, with these applied (metadata) details characterizing each section by expressing or reflecting properties of the section in terms of music compatability with other sections within the overall track. Each section's details therefore explain, in metadata, how each section can be used. The most important therefore relates to the list of entry anacruses ("anacrusis_list") and the list of exits ("exit_point_list"), each of which contains definitions for one or more pertinent anacrusis. Each anacrusis is described using a length in bars, beats and fractions in music time, and then also in pulses and samples for processing and precisely identifying real-time transitions. The length in pulses is used in order to decide which entry anacruses can be matched to which exit anacruses. The length in samples is then used by the software to decide exactly where to crossfade the two selected sections of audio. This length in samples has been pre-calculated by editing tool using the musical timing information, i.e. time signature, beats-per-minute, etc.

The audio file description metadata therefore describe whether or not the ordering of sections can be switched with respect to each other, and if so, what alternative ways exist to permit selected sections to be stitched together to produce a contiguous audio output. It is noted that the same two section could potentially be stitched together in an audibly seamless cross fade in multiple ways, with each alternative requiring selection of a pair of matching anacruses for exit and entry between respective sections.

B) Upload of the Edit

A particular edit can thus be defined as a sequence of re-ordered sections, as well as in terms of corresponding choices of suitable entry anacruses and exit anacruses for each transition between sections.

The returned audio file description can now be used by the Mashtraxx editing app 101, running on computer 12 (or the like), to edit the source track to compile either a standalone Mashtraxx metadata edit file or otherwise a Mashtraxx media file that includes embedded Mashtraxx edit metadata. Whilst the metadata for the edit can take many alternative forms, a preferred embodiment sees this metadata produced as a succession of numbers representing precise time points for each transition. The numbers are therefore associated with pulses used within section details related to "length" and "position", with the numbers acting as time-stamped transitions. Additional information encoded as edit metadata includes a track identifier which could correspond (and preferably does correspond) to the ISRC and, optionally, an applied cross fade duration that completes the picture for cross fading at identified points in a particular audio edit. The audio edit arrangement can be described by defining time points identified from within the audio file description related to the audio source track(s). The unique track identifier used in the Mashtraxx edit metadata could therefore be a unique mapping reference to, for example, the ISRC to allow content tracking of the constituent parts of the original source audio track used in the edit/play.

Compilation of the edit and how it is achieved is described herein. At the point of production and reporting to the Mashtraxx edit metadata the audio file description has served its purpose with respect to the particular edit. The resulting standalone Mashtraxx edit metadata file (e.g. the track identifier and the time-stamped transitions) or otherwise a Mashtraxx media file (i.e. a combination of the audio track and the time-stamped transitions) is then uploaded through the Mashtraxx server for storage in a Mashtraxx database, e.g. database 104.

An edit of an edit can be defined as a subset of the audio used in the original edit, i.e. if the original edit has the structure: Chorus1-Verse-Chorus2, suitable possibilities of an edit-of-an-edit could be Chorus1½ of Verse or Chorus1-Chorus2.

In the first case, since the subset is a contiguous section of the original edit, the reporting mechanism of the edit of an edit is exactly the same as in the original edit (described above). The only difference is that less material from the original song is played, so the client-side reporting is able to report this. The client-side is thus still able to report which sections of the original source audio track are being used.

To provide context, if there is a sub- or secondary edit of an edit, then the cross-fade and ISRC is unchanged since the Mashtraxx edit metadata remains intact. For example, subsets of two audio edits could be joined together so it would be appropriate to report on the exact sections used in both parts. The system is therefore configured and able to send correct reporting information, as both edits are subsets of original edits for which the audio sections and ISRC or other tracking information remains intact.

In a second case, a new edit is created from a pre-existing edit, with this new edit of an edit stipulating different cross-fades. In this case, the editing app 101 requires access to both the original audio track and audio file description. The editing app 101 is configured to determine that it is being asked to modify an edit since the editing app has acquired from the system a Mashtraxx audio track having associated Mashtraxx edit metadata. The original edit can be thought of as a template for the new edit, but the same process of constructing the edit requires the audio file description as only this has all of the information necessary to construct the new edit.

In terms of file content for an edit, this may take any number of suitable forms that permit the edit to be understood by the Mashtraxx system to the extent that the edit can subsequently be reproduced. An exemplary format for an edit for an identified source file edit, may therefore be:

Source file ISRC code Audio US-RTX-16-00007;

"MXAudioTimelineEntry @ 0.000000s : Bar 3 [0-1] : Anacrusis[(0 0 0 0) / –>[0 0 0 0] + 1044 samples] –> 0[2] Exit[ / –>[4 0 0 0]] Anacrusis[(0 0 0 0) / –>[0 0 0 0] + 512 samples]", "MXAudioTimelineEntry @ 10.553016s : Bar 43 [0-3] : Anacrusis[(0 0 0 0) / –>[0 0 0 0] + 132 samples] –> 0[0] Exit[Exit bar 47 / –>[4 0 0 0]] Anacrusis[–(0 2 2 0) / –>[0 0 0 –360] + 282 samples]", "MXAudioTimelineEntry @ 20.851066s : Bar 55 [2-4] : Anacrusis[–(0 2 2 0) / –>[0 0 0 –360] + –813 samples] –> 0[0] Exit[Exit bar 59 / –>[4 0 0 0]] Anacrusis[–(0 2 2 0) / –>[0 0 0 –360] + –425 samples]", "MXAudioTimelineEntry @ 31.067846s : Bar 47 [0-4] : Anacrusis[–(0 2 2 0) / –>[0 0 0 –360] + 282 samples] –> 0[2] Exit[Exit bar 51 / –>[4 0 0 0]] Anacrusis[(0 0 0 0) / –>[0 0 0 0] + 432 samples]", "MXAudioTimelineEntry @ 41.377506s : Bar 3 [0-1] : Anacrusis[(0 0 0 0) / –>[0 0 0 0] + 1044 samples] –> 0[0] Exit[ / –>[4 0 0 0]] Anacrusis[–(0 3 0 0) / –>[0 0 0 –432] + 1034 samples]", "MXAudioTimelineEntry @ 51.954195s : Bar 7 [1-1] : Anacrusis[(0 0 0 0) / –>[0 0 0 0] + 512 samples] –> 0[0] Exit[Exit bar 11 / –>[4 0 0 0]] Anacrusis[–(0 3 0 0) / –>[0 0 0 –432] + 154 samples]"

Or as a representation in a typical JSON form:

```
{
"ISRC": "US-RTX-16-00007",
"edit": [{
"section": {
"name": "Bars 3-6",
"start": {
"bar": 3,
"beat": 0,
"fraction": 0,
"pulse": 1728,
"sample": 47628000
},
"end": {
"bar": 7,
"beat": 0,
"fraction": 0,
"pulse": 4032,
"sample": 111132000
}
},
"entryAnacrusis": {
"length": {
"bars": 0,
```

-continued

```
    "beats": 0,
    "fractions": 0,
    "pulses": 0,
    "samples": 0
    },
    "sampleOffset": 1044
    },
    "exitAnacrusis": {
    "length": {
    "bars": 0,
    "beats": 2,
    "fractions": 2,
    "pulses": 1440,
    "samples": 9922500
    },
    "sampleOffset": 282
    }
    }, {
    "section": {
    "name": "Bars 47-50",
    "start": {
    "bar": 47,
    "beat": 0,
    "fraction": 0,
    "pulse": 27072,
    "sample": 746172000
    },
    "end": {
    "bar": 51,
    "beat": 0,
    "fraction": 0,
    "pulse": 29376,
    "sample": 809676000
    }
    },
    "entryAnacrusis": {
    "length": {
    "bars": 0,
    "beats": 2,
    "fractions": 2,
    "pulses": 1440,
    "samples": 9922500
    },
    "sampleOffset": -425
    },
    "exitAnacrusis": {
    "length": {
    "bars": 0,
    "beats": 2,
    "fraction": 1,
    "pulses": 1296,
    "samples": 8930250
    },
    "sampleOffset": 282
    }
    }]
    }
```

C) Use of the Edit and Report

Turning to the specific issue of content tracking arising after the upload of the Mashtrax edit metadata file, a subscriber device (such as computer 38 or, indeed, the original user operating the device on which the edit was assembled) accesses the Mashtraxx server 111 directly or indirectly via a re-direct function from a subscription media content provider 30. To access the Mashraxx server 111, the subscriber device makes use of a Mashtraxx software 113 that is either locally installed or otherwise a web-based application. The subscriber device 38 is now able to play the edit as defined by the Mashtraxx edit metadata and particularly the transition points and cross-fade duration. There are, in fact, three ways that the subscriber device can play the audio file:

i) the Mashtraxx software 113 can cause the original audio file and the Mashtraxx edit metadata to be downloaded to the subscriber device and then the original audio file re-structured locally by the Mashtraxx edit metadata to recover the uploaded edit. The files can be sent from a combination of databases, or just the Mashtraxx databases 104-106.

ii) the Mashtraxx software 113 causes download or streaming of a fully embedded [and permanently pre-uploaded] version of the audio edit to the subscriber device, thereby both simplifying processing at the subscriber device and simplifying processing at the Mashtraxx server 111 given that the complete edit is pre-stored locally and thus ready for download;

iii) the Mashtraxx software 113 causes the Mashtraxx server or the controller 31 of the subscription media content provider 30 to apply, on-the-fly, the Mashtraxx edit metadata file to the related and identified source track that is itself (a) stored locally within the Mashtraxx system; (b) stored locally on at the subscriber device making the request for access; or (c) stored remotely in a database that serves the subscription media content provider 30. The resulting edit, once assembled, is then communicated downstream as a file or streamed data to the subscriber device that requested the edit.

A consequence of making the request (using the Mashtraxx software 113) from the subscriber for the audio edit (or indeed a file containing the audio edit) is that the Mashtraxx server 111 generates a report detailing use of the sections of an identified track. The request contains a unique track identity permitting cross-referencing into a Label's catalogue of music, whilst the specific timing provided in the Mashtraxx edit metadata ensure that an individual track that is to be played or was played can also be identified. The report can be generated either by the Mashraxx server at the point of receiving the request, at a point when each track starts to play or otherwise in a periodic report at, for example, a time when the Mashtraxx software closed down or times out. Higher visibility is clearly achieved if reporting is based on play of the edit at the subscriber device.

Mashtraxx edit metadata is therefore ancillary to International Standard Recording Codes "ISRC" incorporated or associated with any audio track. The Mashtraxx edit is therefore a derivate of the original artistic work that was the original audio track (typically recorded in digital form), and access through the Mashtraxx system and a Mashtraxx edit [that is based on the Mashtraxx audio file description] provides for consistent content tracking.

Uploaded Mashtraxx edit metadata files do not therefore need to be subjected to any AI interrogations since the provenance of each music section therein is always preserved since this provenance was coded within the Mashtraxx audio file description initially drawn down for manipulation by the Mashtraxx editing app 101.

Consequently, when each of the now-stored Mashtraxx edit metadata files is called for replay by Mashtraxx software 113 running on a subscriber device, such as laptop 38, the commerce server need only note the call and apply the stipulated use policy to serve complementary media pre-stored on advert database 108 and delivered with access to the edit. Indeed, complementary media can be delivered in a targeted fashion based on, for example, a pre-registration of a computer address or a log-in procedure that identifies the user who is requesting the edit.

Reporting on the use of each track section is therefore greatly simplified since the provenance of each section is recorded and known because playing of each section (of the Mashtraxx metadata file) is arranged to generate a traceable report that relays the unique and permanent track identifier and express section identification into the infrastructure components, namely at least one of the Mashtraxx server 111, the commerce server 46 and the subscription media content provider 30, if not all these component nearly instantaneously (if desired) or otherwise at a fixed reporting time. This means that, in following the system of the present invention, tracking of content is now precise in terms of both when it occurred and how many occurrences of an identified section of a track are used. Moreover, since the system of FIG. 2 is able to track individual sections as they are played and is user-centric (rather than server-side driven), it is possible for the system both to identify specifically popular musical sections and to split, i.e. apportion, revenues associated with the playing of licensed music tracks (with or without video) precisely between the copyright owners of the original artistic works.

In summary of the process behind the system of FIG. 2, the physical assembler of a Mashtraxx edit of an audio file (or multimedia file containing Mashtraxx audio data) will, on a local editing device, such as computer 12, identify the original music track, e.g. through downloading the original music track and playing the original music track. The user will then, through a network and system request, obtain a corresponding Mashtraxx-augmented audio file description. This audio file description allows the user to manipulate sequencing of sections within the Mashtraxx track(s) based on common music themes and commonality between beats, bars and temporal alignment of musical onsets between anacrusis, as characterized in the audio file description.

In a preferred embodiment, the editing application instantiates a visual representation of the Mashtraxx track using a combination of an audio waveform and the audio file description for sections as they would contiguously play in the original audio track. The user is then provided with an ability to generate a new track edit by selecting a starting track section and then being shown only those other sections within the entirety of the audio track than can be cut into the first section whilst preserving a seamless transition in the beat or rhythm of the adjacent sections. After selection of a second abutting section of music (which may have a different musical theme and musical intensity), the process can be repeated or terminated, thereby producing a new track edit having a different section time line. Optionally, this saved edit can then be augmented with video or still images and the resultant compilation uploaded into the Mashtraxx uploads database 106. Track identification and timing is then communicated uplink and stored at Mashtraxx databases (or other accessible databases).

By adopting this client-side approach to tracking content, any uploaded media file that makes use of the Mashtraxx metadata can be seen in the context of the Label's stipulated use policy to allow for precise revenue distribution dependent upon specifically identified track usage. The system can, in fact, report on which parts of an entire audio track are used, and where in the derivative edit the use of the section occurred. This is because the system, in general, is aware of the origin of each section and the audible reproduction of the edit from any machine running the Mashtraxx application 113 causes the Mashtraxx databases 104-106 to be accessed. Moreover, any iteration of any edit will always preserve the provenance to the original source file since some form of unique and permanent section identifier (recorded in the Mashtraxx metadata as a time stamp for a particular track) is always preserved and always present.

Conversely, given the knowledge that a listener has heard a certain amount of time of a particular Mashtraxx edit, it is possible for the system to work backwards and determine exactly which parts of the original audio file were heard.

A report from the Mashtraxx server 111 to the commercial server 46 and/or the controller 31 of the subscription media content provider could therefore take the exemplary form shown in Table 1 below (for each track), with this report generated to reflect the uplink requests and/or uplink reports from the device playing the edit. The precise form of reporting is freely adaptable, as will be understood, and simply needs to include sufficient information to link the report to an ISRC (or the like) and to identify the use of identified sections in the edit that have been played. Certain information is entirely optional, e.g. a repetition of other information presented albeit presented in a user-friendly format, and may therefore be included simply to assist interpretation of the report.

TABLE 1

| ISRC identifier | Number of devices using edit | Artist Info (optional) | Track Name (optional) | Section Identification | |
|---|---|---|---|---|---|
| | | | | Timing (between samples) | Use |
| US-RTX-16-00007 | 3 | Jean-Michel JARRE | Oxygene pt.4 | 1102336-1606587 (Bars 15 to 21) | 4x |
| | | | | 683008-1102336 (Bars 10 to 15) | 1x |
| | | | | 34127-683008 (Bars 2 to 10) | 1x |
| | | | | 1943040-2280122 (Bars 25 to 29) | 2x |
| | | | | 1606587-19943040 (Bars 21 to 25) | 1x |
| | | | | etc. | |

It is noted that the commercial server could, in fact, be the controller 31 of the subscription content provider 30.

The uplink report from the device playing the edit may include significantly more detail concerning times, but will include at least section identification and the unique track identifier, e.g. the ISRC.

In the event that the client, i.e. the computer 38, simply wants to download the original (unedited track), then the Mashtraxx server 111 nevertheless still provides an editable track containing the audio file description. In a similar vein to the foregoing "edit" example, this audio file description can either be separate to or entirely embedded within the unedited original version of the source track. The provision of the audio file description therefore always allows the client to edit and upload the real-time data points that define a precise boundary between contiguous sections. However, in the instance where there is no edit and the user merely plays the original unedited, i.e. pristine, original version of the audio track, the locally instantiated software (or the web-browser running on computer 58, as the case may be) operates to send back a report that simply lists in time the transition points between pre-identified contiguous sections of the original audio track. The selection of the anacrusis is already addressed since this is in effect the default position of within the original source track and the associated audio file description. In other words, when playing the original audio track at the client, the sections already have seamless audible transitions between adjacent sections with these transitions maintaining the original flow and rhythm of the original audio track by reporting in real time the existing boundary points between existing contiguous sections. However, by reporting back the transition points from the client-side, the server is now able to itself identify the playing of those sections irrespective of whether the playing is from the beginning to end or only a portion of the audio track. The Mashtraxx server 111 can then itself generate a report to the commercial server 46 to apportion precise use of the track for content tracking/licensing concerns.

In terms of the reporting of usage at the client and the generation of a suitable data log that provides a traceable reference back the unique track identifier (or a specific musical section if those are themselves uniquely identified other than by timing), the local operating system "OS" of the client can also provide ancillary information in the log, based on existing built-in OS functions. For example, the OS can be tasked to determine and then report on the output mechanism employed locally at the client to play, process or otherwise manipulate the audio track data, i.e. the tracking data reported uplink by the client can include information about how the identified source audio track was used, performed or manipulated at the client device. For example, the OS can code data into the log about the nature of the line output used at the client device or the speaker socket or HDMI port used during playback or manipulation of the audio data in the selected track. Other OS functions that can be seized for use in supplementing the uplinked report include port_airplay, port_built-in_receiver and the use of local wireless communications, including Bluetooth or optical pathways, at the client device.

Reportable statistics can include, by way of example, the number of times that at least part of an audio track is played at the client (within, usually, a window of time in which a app is continuously running). Other forms of reported playback can simply be start and stop locations, but also start of digital sampling of a track and the location of a start point as achieved through a seek process that skips through musical sections.

The report can be structured to precisely identify local edits, although the statistics in the uplinked report may infer—and thus require some interpretation and resolution at the server—the nature of play or modification of the selected audio track at the client device.

The log and report, refenced into, i.e. linked to, the traceable unique identifier for the selected audio track, is sufficient to allow an understanding to be gathered as to:
the assembly of derivative works at the client device, such derivative works including at least one of an edit and/or the augmentation of the selected audio track through inclusion of new audio content (such as voice-over or singing or instrumental addition);
synchronization of the audio track including at least one of:
video synchronization with the audio track;
picture synchronization with the audio track; and
synchronization with user-generated content;
mechanical or electronic copying of the audio track, including:
sampling of the audio track
extracting timing information from the audio track to support synchronization of sensory-perceivable effects with the audio track, e.g. variations in light levels, drum beats, video effects and edits as typically used in video games.

The provision of the audio file descriptions may, in some embodiments, be restricted to identified client devices.

II. Track Assembly & Cross-Fade Considerations

It is appropriate, at this point, to explain how seamless alignment can be achieved between seemingly different sections of one or more tracks.

PCT/GB2016/051862 describes a system and method in which there is a contextual synchronization of sections (or slices) of a digital audio track relative to real-world events. The sections are characterized in terms of a user-perception and/or machine-based evaluation that categorizes each audio section in terms of a perceived "theme" as suggested to the user or machine by an underlying rhythm or beat detected or otherwise identified within the audio section(s).

In PCT/GB2016/051862 there is described a method of splicing together between two audio sections having pre-identified contextual themes reflected in related metadata of the two audio sections, each of the two audio sections having a start point and an end point related to its assigned theme. This can alternatively be considered to be a fading between a first audio section and a destination audio section, the first audio section and the destination audio section each containing an onset associated with an anacrusis that is related to a selected abstract exit point or abstract entry point in an audio track.

The splicing method comprises: producing a first time base for each of said two audio sections by partitioning each audio section into rhythmic beats each having an identified tempo; producing a second time base by partitioning each beat of each audio section into measurable fractions by dividing each beat into at least a plurality of equal and evenly-spaced time divisions within each beat; determining at least one entry anacrusis in a destination audio section that is proposed to follow a first audio section, each of said at least one entry anacrusis providing a first timing displacement in terms of beats and fractions relative to the start point for the destination audio section; determining at least one exit anacrusis in the first audio section, each of said at least one exit anacrusis providing a second timing displacement in terms of beats and fractions relative to the end point for the first audio section; contrasting the first timing displacement with the second timing displacement to identifying whether there is a correspondence between the first timing displacement and the second timing displacement; and rejecting a potential splice from the first audio section to the destination audio section in the event that there is no correspondence between the first timing displacement and the second timing displacement, otherwise recognizing that the first audio section is splice compatible with the proposed destination audio section.

The fading method comprises: selecting, in the first audio section and the destination audio section, anacruses that have corresponding measured displacements in time to abstract exit and abstract entry points respectively in the first audio section and the destination audio section; measuring time differences of onsets in each of the first audio section and the destination audio section from the anacruses to create actual exit and actual entry points used to transition between the first audio section and the destination audio section; assessing which respective onset in the first audio section and the destination audio section occurs earliest in time with respect to the aligned anacruses in the first audio section and the destination audio section; and effecting a cross-fade between the first audio section and the destination audio section at a point at or before said earliest onset starts to rise, such that the destination audio section replaces the first audio section as an active audio output to realize a seamless rhythmic transition in audio output.

This methodology permits identified musical phrases or themes to be synchronized or otherwise linked into a real-world event. In this context, "musical phrases or themes" define a "section" of audio that have a set of definable characteristics that complement, reflect or otherwise match the contextually-perceived and identified nature of events presented as a temporal input. The sections of audio therefore "serve the aesthetic of" the context of events. The achieved synchronization beneficially realizes a seamless musical transition—achieved using a timing base to match accurately a pre-existing but identified music signature or beat—between potentially disparate pre-identified musical phrases having different emotive themes defined by their respective time signatures, intensities, keys, musical rhythms and/or musical phrasing. Overall sensory experiences of a user in the real world is augmented by dynamically changing, re-ordering or repeating and then playing audio sections within the context of what is occurring in the surrounding physical environment, e.g. during different phases of a cardio workout in a step class the music rate and intensity increase during sprint periods and decrease during recovery periods. The accompanying music is automatically selected in real-time to accompany changing physical or local environmental events, with synchronization of the audio sample causing that audio sample to become an integral but complementary part of an overall sensory experience.

With respect to editing and compilation of the Mashtraxx audio file, a software editing suite, optionally provided in the form of a downloadable application, provides a consumer with the tools to edit and re-engineer existing music content dynamically and in real-time to achieve syncing to user experiences. More particularly, the system and methodology provide opportunities for dynamic syncing of digital music content to match lifestyle, activities and consumer choice, with synchronization based on a characterization of a theme in a defined audio section and the subsequent establishment of suitable entry and exit points from that audio section based on anacrusis events within the audio section. The software application permits for the selective re-imaging and track synchronization of, for example, a user's favourite songs to specific physical stimuli to suit the conditions of the moment, like going for a run or a taking a walk or alignment with a scene in a video clip, thereby producing a customized and user-bespoke experience. The system therefore produces and supplies for use, such as immediate play or broadcast, a composite media file that correlates instantaneous or changing real-word events with customized and user-selectable audio components designed to augment an overall sensory experience.

As such, greater re-use and rearrangement of current digital music for real-time syncing to various media is achieved, with use of the metadata-based synchronization applicable across numerous different application areas, including exercise, video gaming, personal video compilation and advertising. Based on changes in the environment, the system creates and more especially permits the edit and re-assembly of music content presented in one or more temporally disparate audio sections or audio files to suit the occasion. Audio output therefore changes, for example, with sensed changes within a game such that the audio output is synchronized music that accompanies the in-game action or the mood and action within a DVD. The resulting music file format, including characterizations of the musical segments with tags embedded in metadata, gives users the ability to use their favourite music tracks on their videos and in social media applications.

The Mashtraxx database 104 therefore contains one digital audio file or a multiplicity of digital audio files meta-tagged to provide a plurality of audio sections stored in the database, each of said plurality of audio sections having abstract exit and abstract entry points and each abstract exit point and abstract entry point having at least one anacrusis with a timing offset that corresponds to an onset that represents a point of maximum difference in transience in audio around the anacruses. An editing component is then arranged: to select anacruses that have corresponding measured displacements in time to abstract exit and abstract entry points respectively in a first audio section and a destination audio section, wherein the first audio section is played and the second audio section is to become active and played; to assess which respective onset in the first audio section and the destination audio section occurs earliest in time with respect to the aligned anacruses in the first audio section and the destination audio section; and effect a cross-fade from the first section to the destination audio section at a point at or before said earliest audio onset starts to rise, such that the destination audio section replaces the first audio section as an active audio output thereby realizing a seamless rhythmic transition. Of course, each of the sections are further uniquely identified, but this unique identification is relevant for tracking of content (as explained above in the context of FIG. 2) and not for how the track is assembly/recompiled.

Figure 3:
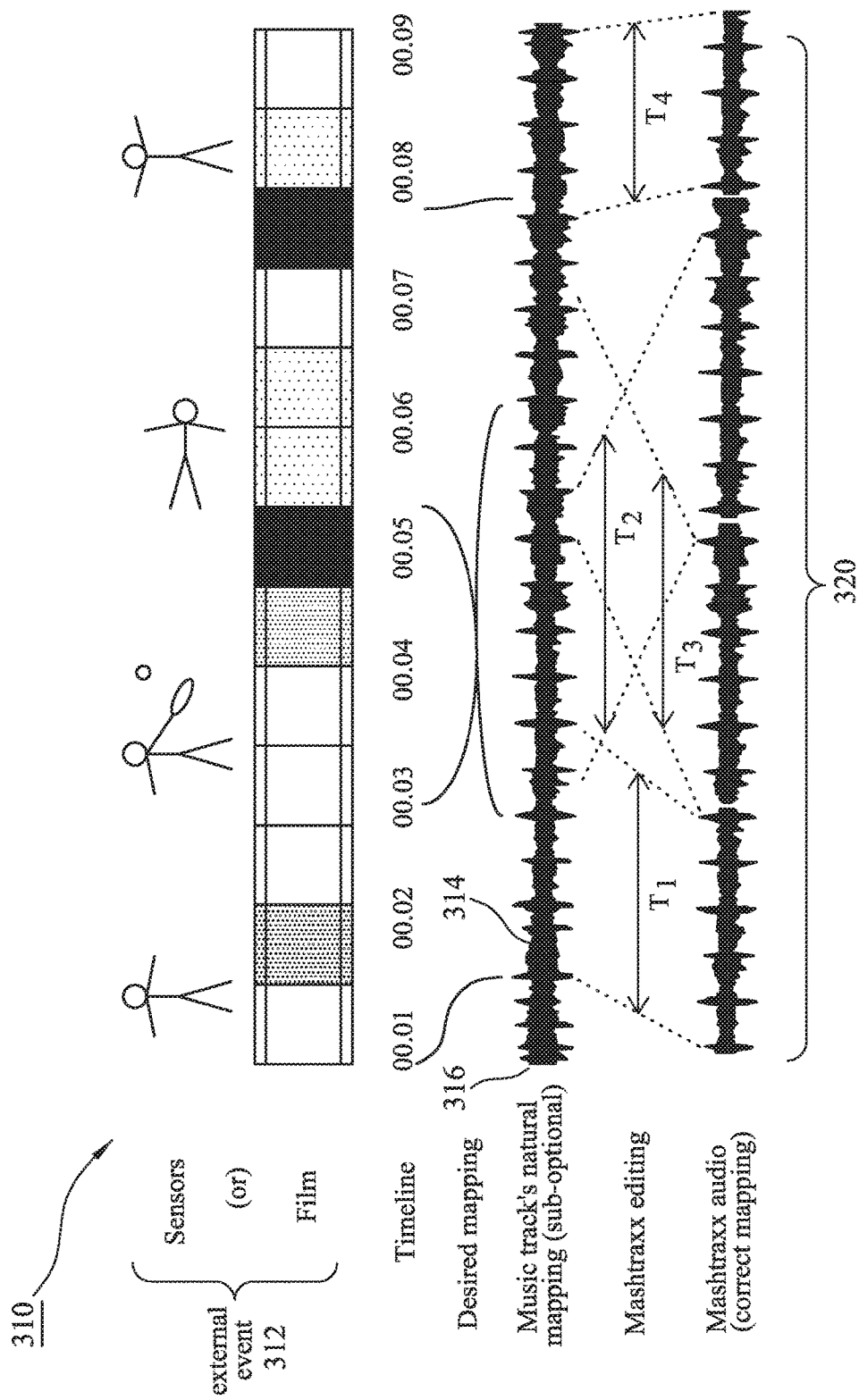
FIG. 3 is a diagram representative of a relationship that is established between a real-world event and a piece of audio, such as a section of music and wherein the relationship is established in accordance with the present invention.

To identify sections and to store sampled segments of music (or the like) within a database, the editing application operates in the following fashion. Referring to FIG. 3, each section 314—each of which may a have different duration $T_1$-$T_4$—is encoded with metadata that identifies the section (and its theme) and/or particularly resolvable contextual qualities of the section 314. Access to and reference of the metadata allows the sections to be subsequently re-ordered in time so as to permit alignment of the sections with related, i.e. relevant, real world events.

Preferably, the system never alters the original audio file, but rather it makes use of assembled metadata that allows a playback engine to jump around a suitably encoded file, editing and cross fading it in near-real time (save for some appropriate buffering to allow for processing).

By way of non-limiting example in the context of exercise, a music track may include an upbeat tempo for a chorus, with the upbeat tempo therefore appropriate for a faster heart rate induced by a higher rate of energy output during a sprint part of the exercise. In contrast, the same music track may include a half-time section. The half-time section would therefore be more appropriate to an active recovery period during the exercise, but not the sprint. The system therefore produces a variety of identified sections, i.e. slices of a track, that can be moved in time so as to align more appropriately with externally-driven activity. This movement in time may cause the reordering of sections, i.e. a naturally contiguous sequence in an original music track may yield a sequence $T_1$, $T_2$, $T_3$, $T_1$, $T_5$, $T_6$, $T_1$ where $T_1$ is a repeated chorus and $T_2$ to $T_6$ are verses, themes or musical movements. This movement in time also may cause the overall duration of audio output to be extended or truncated in relation to the original music track. Identification of the theme and the storage of a related characterization of the section into metadata might lead to a re-aligned ordering of the section (relative to a film) that produces an audio output having a different sequence $T_1$, $T_1$, $T_6$, $T_2$, $T_3$, $T_1$, $T_1$, $T_1$. This reordering is represented in FIG. 3 by the "Mashtraxx" audio spectrum 320 that shows this re-ordering of Mashtraxx sections. Preferably, adjacent sections are contiguous with each other, e.g. there is no discernible change in music rhythm and/or there is no discernible silence between adjacent sections. A mechanism of fading between an active sample section of a track and a stored section (of either the same track or a different track) is described later having regard to FIG. 7 and FIG. 9.

The arrangement thus permits identified musical sections to be synchronized and linked into a real-world event. The achieved synchronization includes a seamless musical transition—achieved using a timing offset, such as relative advancement, preferably to match accurately a pre-existing but identified music signature or beat—between potentially disparate pre-identified sections having different emotive themes defined by their respective time signatures, intensities, keys, musical rhythms and/or musical phrasing. The preferred embodiments therefore augment the overall sensory experience by changing between musical sections (and thus differing themes) within the context of what is occurring in the surrounding physical environment, e.g. during different phases of a cardio workout in a step class the music rate and intensity increase during sprint periods and decrease during recovery periods. The accompanying music (or audible content, such as non-diegetic and diegetic sound design or acousmatic sound) is automatically selected in real-time to accompany a changing physical event—which may be monitored electronically in real time, such as with a heart-rate monitor—and thereby forms an integral but complementary part of an overall sensory experience. Rather than real-time monitoring, the accompanying audio sample, such as a snippet of music, can be pre-programmed to be tied and played with a trigger point, such as a change in scene within a video game.

As indicated above, as an input in the editing suite, the system 430 (of FIG. 4) acquires real world external events 312. These can be real-time sensed events or recorded events stored on a medium and presented to the system through a communications interface 432. A processing environment 434 typically includes at least one processor that runs program code stored in memory 436.

The processing environment 434 may be supported on a variety of platforms, including a server connected through a network, a tablet computer, PC or a smartphone.

The memory 436 may be local to the processing environment 434 or remotely located in a distributed system. Applications ("apps") stored in the memory 436 permit for the automated analysis of real world events and, moreover, permit characterization of sampled time-domain data within the events relative to a pre-identified vocabulary of terms 438 (which are also stored in memory 436). In practical terms, an input signal corresponding to a monitored or recorded external event 312 can contain multiple different characteristics, e.g. differing heartrates associated with different phases of exercise and active recovery (such as shown in FIG. 3) sensed and reported from a real-time monitor, or otherwise in the context of a video there may be identifiably different facial expressions, different pixel intensities and/or rates of pixel movement for a blob as it moves across a screen. Other characteristics reflective of an emotion or activity may be defined.

The common thread is that identifiable characteristics vary with time since external activity changes with time since the emotional or physical state of the environment or individual changes with time. The event input—regardless of form—can therefore be considered to be an assemblage of multiple contiguous event segments of sampled event data having different but identifiable themes. Functionally, the processing environment 434 is configured to reference each event segment against at least one pre-stored vocabulary word, with this reference recorded either permanently or on a transitory basis with the event segment. The vocabulary words for each event segment act as a key or "briefing element" that can be subsequently used to cross-reference and ultimately select a relevant audio section that has similarly been characterized with a corresponding or closely related vocabulary word which can be stored within metadata for the audio track, stored in an associated file and most preferably compartmentalized within a header for each audio section. Unless the specific context requires a more limited interpretation, the terms "audio section", "segment", and "audio slice" should be considered as equivalent and representative of varying length samples from within a digital audio file.

As a secondary input to the processing environment 434, a user interface 440 may be provided to permit a user to critique the external event input 312. This critique function may be independent or complementary to the automated analysis that generates the briefing elements. The manual critique therefore also ascribes and attaches vocabulary words to events segments and therefore provides an alternative or supplementary process for generating briefing elements.

Returning to FIG. 4, the functional analysis of the external events as performed by the processing environment can include:

i) Relative and/or actual timing 442 within the external event 312. For example, timing analysis can identify events that satisfy a minimum threshold value, events/features that have a sustained duration and/or hit points. A hit point is a given moment on the timeline of a game or film when some action happens that requires a musical feature to occur at, i.e. "hit", the same time. Another industry name for a hit point is "Mickey Mousing", e.g., in a Tom and Jerry cartoon, there may be a loud wood block note sounded after a bowling ball has rolled along a shelf and then fallen to the head of Tom, the cat. Alternatively, sometimes hit points take a given length of time; this is more aptly referred to as a "sustained feature". For example, after the bowling balls has fallen on Tom's head and after it has bounced away, Tom shakes uncontrollably for three seconds. A related sustained feature might therefore be realized by the sound made by a ruler as it is twanged on a desk, with the sound of the vibration sustained for a period of three seconds before being faded out or ending.

ii) Intensities 444 and the scaling of intensities within the external event. For example, intensities can be based on relative light levels or sound levels or changing rates in a monitorable function (such as heartrate) received from the external source via the input 432. Intensity may also relate to an emotionally-perceived intensity that identifies how a particular section in a piece of audio is significant or subordinate relative to other sections in the entire piece of audio, which may me a complete song or compilation of tracks from different audio sources or recordings, e.g., different tracks from different audio CDs. Intensity can therefore be a subjective measure set according to a user's taste or preference.

iii) Audio function analysis 446, including but not limited to beat analysis, time signature analysis, climatic movement identification, intensity increases or decreases, dramatic drop out where audio suddenly ceases, static or rhythmic analysis, underscoring and identification of a riff.

Once the event segments have been keyed to and briefing elements therefore produced, these events segments can be streamed over a network or otherwise stored 450 for later retrieval and use by section assembly intelligence 452. This section assembly intelligence 452 is based on processing support by an artificial intelligence ("AI") and may alternatively be referred to as the "Mashtraxx framework". The section assembly intelligence 452 is configured to provide additional processing and the generation of a new media sample (or "composite media file" 454) in which new audio, such as a new music track, enhances the event segments from the real-world event in a seamless and sequenced fashion. The new audio may, in fact, supplement or substitute audio samples captured from the real-world event.

The section assembly intelligence 452 is responsive to additional inputs, namely an enhanced audio track 458 containing Mashtraxx metadata 458 for segments or slices of the original audio track. The audio track can, in fact, be multiple samples from multiple user-selected tracks or from a single recorded audio file (which need not be music). The audio track 456 could, for example, be provided by an iTunes® library or streamed or otherwise acquired from a music repository. The generation of Mashtraxx metadata will be described subsequently.

The generation of Mashtraxx metadata will be described in more detail below and in specific relation to FIG. 4. However, in overview, Mashtraxx metadata provides an audio segment definition, including track time signature(s) and other musical properties and/or functions, supplied as data associated with the audio track. A modified digital audio file for a track may include metadata tags that are married to musical events in the track, such as cymbal spills and drum beats. Alternatively, access to the Mashtraxx metadata can be accessed or streamed from an externally managed data repository/database accessed through a local app running of a device. In this latter respect, a device-based app is preferably arranged to pull Mashtraxx metadata from the remote database based on a registered status of the original copyright artistic work, i.e. the audio track, with the local device/user. In the event that the original audio track is deemed an illegal copy, a prohibition on access to the Mashtraxx metadata can be imposed and/or, otherwise, the app can flag the illegal copy or disable playing of the original track until such time as the track/user is validated by an authenticated licence for the original track.

For anti-counterfeiting purposes, a locally-installed app checks local content by fingerprinting the audio; this can be based on any number of known techniques, including track metadata in the track header and/or intra-track analysis through audio sampling. The app is configured to then check a central database containing Mashtraxx data, with the check revealing whether Mashtraxx data exists for the identified track. If so, the app is configured to present the Mashtraxx data to the user as a Mashtraxx option within the app.

Acquiring a licenced status is well understood and is typically based on a registration process. Registration for copyright usage is not, however, germane to the fundamental issues of the present system and, especially, the creation of metadata tags that are used to augment an immersive sensory experience associated with coordinated audio complementing changing real-world events.

Figure 4:
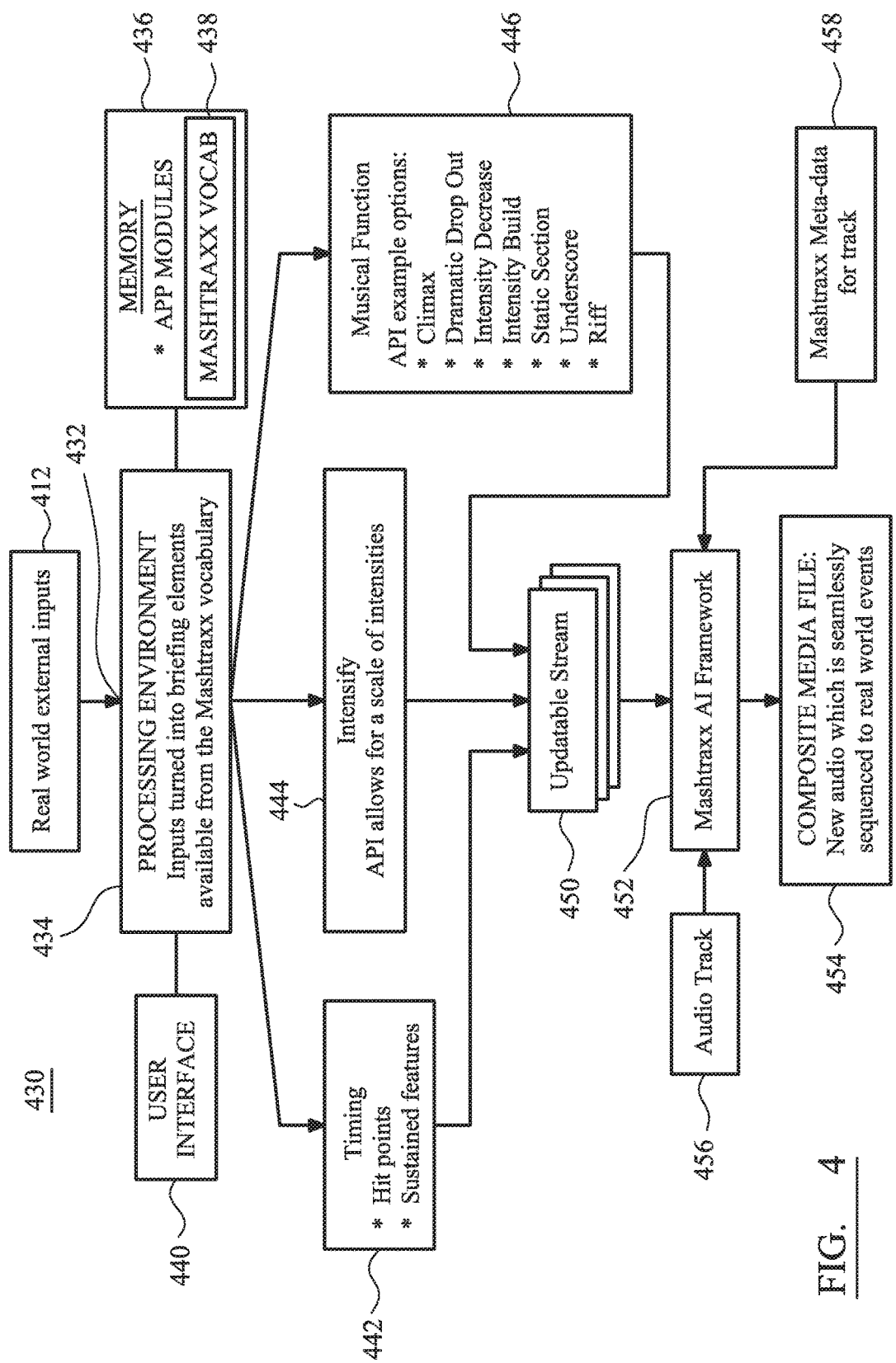
FIG. 4 is a schematic representation of a system in accordance with a preferred embodiment of the present invention.

FIG. 3 is a functional diagram of section assembly intelligence 452 employed within the system of FIG. 4.

For the audio sections that are to be inserted and which have been pre-characterized in terms of their inherent themes (for which a tag has been placed in the corresponding metadata of the audio sections, as will be explained later), the section assembly intelligence 452 selects 559 and orders 560 the audio sections to correspond to the real-word event(s). This results in an ordered set of audio sections 562 that may include contiguous repeating passages of music. Selection of the appropriate audio section requires consideration and analysis 564 of the metadata tag and, optionally but preferably, an assessment 566 of whether the selected audio section 562 in itself contains sufficient material to provide for its insertion. A determination that there's insufficient material leads to one or more of a rejection of the audio section, a decision to repeat, i.e. loop, the audio segment so as to fill the entirety of the duration for the real-world event, and/or advising of the user through the user interface (of, for example, FIG. 4 when typically realized to include a graphic user interface "GUI"). Looping may involve an intra-section loop reflected by pre-storage of a metadata tag. This intra-section loop permits establishment of a loop internally within a section and therefore defines cut points that are internally self-consistent.

Selection of the audio segment may be dictated by direct user input of a briefing note into the system through a control interface. The briefing note indicates variable parameters including, but not limited to, duration, the nature of hit points within a track and the mood of the track. Alternatively, the user may be presented with multiple alternative track options each having a common theme, and then ask to indicate a preference. A fully automated system is an alternative.

Independently of the process that actually executes a fade and/or direct cut from an active audio track to a destination track (as discussed with particular regard to FIGS. 8a to 8c), the frame assembly intelligence 552 is configured to assess whether sections in different tracks are fundamentally compatible and, preferably, compatible to the extent that they are able to be spliced or cut together to produce an audibly seamless transition therebetween. The preferred process will now be described with reference to FIGS. 9, 10 and 12.

FIG. 9 is a spectral representation of different sections of music, the sections having exit and entry points determined in accordance with a preferred embodiment. FIG. 9, which shows an edit point process that can be executed independently for aligning related themes in selected audio sections, is a precursor to rearrangement of selected audio sections into a consolidated data format that, eventually, is aligned with real-word events to augment the sensory experience by reinforcing a contribution made to an accompanying sound stage.

In FIG. 9a, an audio spectrum 151 for an audio section ("audio section 1") where envelope changes are highly simplified and shown as blocks with abrupt transitions. The spectrum 151, as will be understood, has a time domain representation that varies with time. A time base, in the form of musical bars ("Bar 1" to "Bar 8" for section 1), partitions the audio section between a nominally identified "abstract" entry point 152 and a nominally identified "abstract" exit point 154. The abstract entry point 152 and abstract exit point 154 therefore define the audio section, with these abstract points determined and selected by either an MIR function and/or user input to identify a characterizable transition between different themes within the totality of, for example, an entire song track. "Themes" are therefore contextually different aspects with an audio track or assembled composite. Themes can classify a context of a section both in terms of perceived/identified similarities or differences. Themes are therefore coded within a database related to the sections of the track and may be coded directly into ascribed metadata.

Unfortunately, it has been recognized that, because of the nature of audio, the abstract entry point 152 and abstract exit point 154 will likely not coincide with effective, i.e. actual, exit points 162, 164 and entry points 166, 168 for an audio section. For example, within section 1 (reference numeral 160 of FIG. 9a), there may be one or more possible abstract exit points 154, 155, with each abstract exit point 154, 155 having one or more actual exits points 162, 164. In this exemplary context, a theme transition may be identified to occur at the transition between Bar 4 and Bar 5, whereas actual exit points 162, 164 (that take into account a time base and beat) could occur at different times within Bar 4.

Before being able to transition between sections, it is therefore necessary to look for compatibility between different sections and, moreover, timing transitions that provide a substantially seamless audible transition. In the first instance, identified and applied metadata tags can provide an indication of acceptable correlation between different themes. For example, assuming a numeric scaling of theme between one and eight, a first audio section may have a theme one characterization that might be representative of a slow and melancholic scenario. In contrast, a second audio section may have a theme two characterization that might be representative of a slightly faster (relative to the first audio section) and contextually more intense atmosphere. A third audio section may have a very energetic perception and therefore be characterized as having an intensity (i.e. a user-defined level) scaled at a level eight-of-N (where N is an integer) characterization. In this example, a transition between theme one of a first section to another theme one in a different music section appears eminently achievable from the perspective of a seamless audible transition. It may also be possible to transition seamlessly between the first section and the second section given the apparent closeness in characterizations. However, in reality, it may not be feasible to transition from the first section to the third audio section just based on an assessment of characterization of the underlying theme to the respective audio sections. The preferred embodiment, however, provides a solution to this seamless audible transition issue.

It is therefore necessary to investigate further the nature of the actual exit and entry points between an active audio section and a proposed destination audio section that is to be cut into the audio. Actual exit points are selected from at least one and usually a plurality of suitable exit points that tie into an identified anacrusis. Suitable exit and entry points are identified (and stored in a database) for each audio section in advance of editing so that minimal buffering is required by the intelligent processing environment 452 to assemble an edited audio that is complementary to a resolvable flow of external event stimuli. Transition between audio can therefore be achieved substantially in real-time, with no discernible loss of audio continuity irrespective of whether sections are selected dynamically as real-world events unfold.

FIG. 9b is an expanded view of Bar 4 of FIG. 9a. Again, for the sake of clarity, the audio spectrum of Bar 4 is shown as a simplified block form that has signal excursions that vary with time. Bar 4 is divided into four beats ("Beat 1" to "Beat 4"), with each beat further divided into an equal number of fractions ($f_1$ to $f_4$)—in this case four equal fractions per beat. With respect to the abstract exit point 155, actual possible exits points will correspond to a point at or immediately before or after an anacrusis (alternatively and interchangeably referred to as a "pickup" or "onset"), as shown in FIG. 9b in relation to "Possible Actual Exit B 164". An anacrusis is a note or sequence of notes which precedes the first downbeat in a bar of music. Therefore, through MIR and/or user input, anacrusis for actual exit points are identified in proximity to the abstract exit point 155. In the exemplary case of FIG. 9b, the anacrusis precedes the abstract exit point by: i) in the case of a first possible exit point 162, a distance of minus one beat and zero fractions; and ii) in the case of a second possible exit point 164, a distance of zero beats and minus two fractions.

Figure 9C:
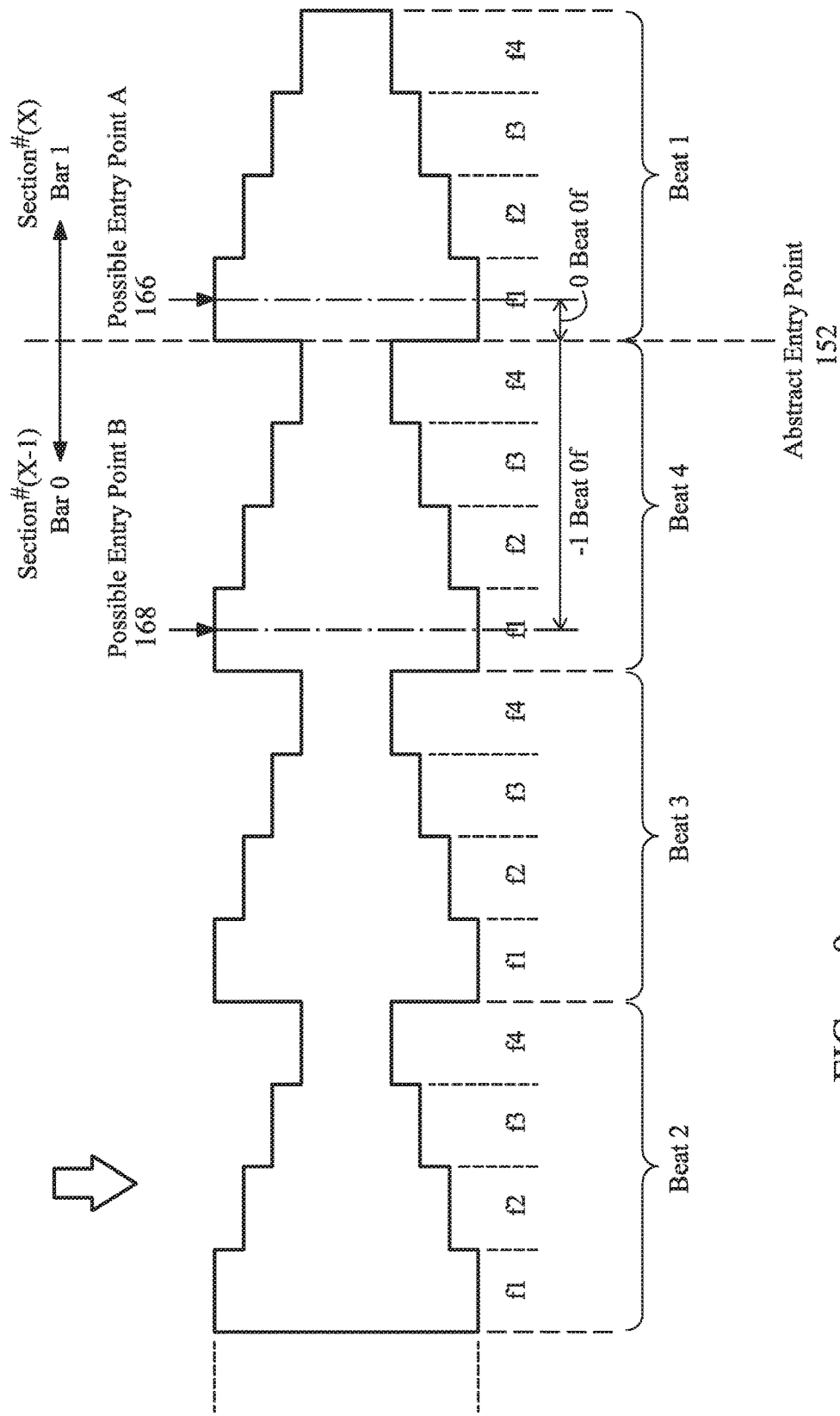
FIG. 9, composed of FIGS. 9a to 9c, is a spectral representation of different sections of music, the sections having exit and entry points determined in accordance with a preferred embodiment of the present invention.

A similar assessment must be conducted to identify an entry point into an audio section. Reference is now made to FIG. 9c. Actual exit points are selected from at least one and usually a plurality of suitable exit points that tie into an identified anacrusis. Again, for the sake of clarity, an audio spectrum of Bar 0 and Bar 1 is shown as a simplified block form in which signal excursions vary with time. Bar 0 and Bar 1 have each been divided into four beats ("Beat 1" to "Beat 4"), with each beat further divided into an equal number of fractions ($f_1$ to $f_4$)—in this case four equal fractions per beat. With respect to the abstract entry point 152, actual possible entry points 166, 168 will correspond to a point at or immediately before or after an anacrusis. Therefore, through MIR and/or user input, anacrusis for actual entry points 166, 168 are identified in proximity to the abstract entry point 152. In the exemplary case of FIG. 9c, the anacrusis straddles the abstract entry point by: i) in the case of a first possible entry point 166, a distance of plus zero beats and zero fractions; and ii) in the case of a second possible entry point 168, a distance of minus one beat and minus zero fractions.

As a summary of the process for identifying precise and actual entry and exit point locations within an audio section, the preferred embodiment partitions the sections of audio (identified in terms of themes) into recurring units of time, e.g. rhythmic beats (which may have a variable duration). Each beat can have its own "tempo", with the term "tempo" being understood to mean the number of units of time per minute. These beats are then divided or "fractionalized" into at least a plurality of equal and evenly-spaced time divisions (termed "fractions"). The number of factions within adjacent beats may vary. The duration of fractions between adjacent units of time ("beats") can, however, be different because of each unit of time potentially has its own tempo. Therefore, with respect to the first time base related to beats and a second fractional quantum measure in a second time base, an approximate location of a potentially suitable but significant entry/exit point, i.e. an anacrusis, is determined relative to a start/end point of an identified section. It is this measured displacement in time—expressed in terms of beats and fractions—to the anacrusis that permits seamless integration of one section of audio to another different section of audio. More specifically, to affect an audibly seamless transition, the processing intelligence of the system looks for an exit point and an entry point—expressed in terms of beats and fractions—that has the same measured displacement (as expressed in terms of beats and fractions).

A database 200, as shown in FIG. 12, is therefore assembled and made available to a device operating within the system of FIG. 4. The database 200 therefore correlates music tracks to related track metadata. More especially, the database maps audio sections 202 to identified themes 204 of tracks 206 and how these themes are defined with respect to a defined timing 208 within the section. Finally, each theme 202 is broken down into at least one and generally a multiplicity of edit-worthy entry points 210 and exit points 212 that relate to anacrusis events (expressed in terms of beats and fractions).

Returning to FIGS. 9b and 9c, the cut between sections would therefore be made from the active audio section at Bar 4 and at the start of Beat 4 (reference numeral 162) to section (X−1), Bar zero, Beat 4 position (that has a anacrusis displacement of one beat, zero fractions) for entry point 168. Of course, other combinations of beat and fractions displacements for the anacrusis will occur, with these driven by the audio. Buffering is used to compensate for timing retardation or advancement, as necessary, to align the cut between different sections.

The objective of FIG. 9 is therefore to support an effective editing function and, more especially, to permit edit points to be identified relative to specific quantized distances from bar transitions—related to any time signature—and beats and fractions of a beat within the rhythm of the audio.

Figure 10:
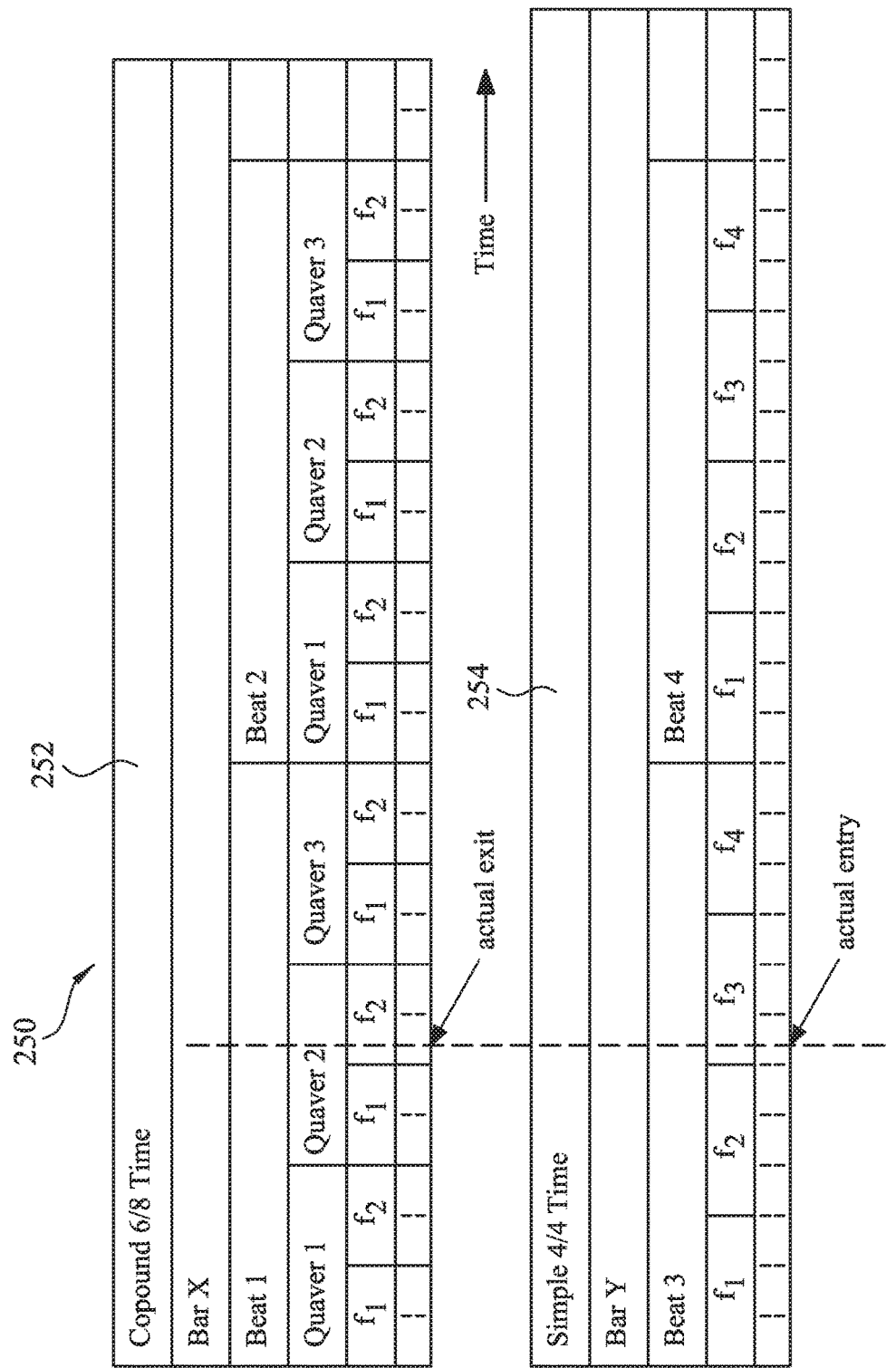
FIG. 10 is a timing diagram showing relative timing between different time signatures in different sections of music.

The database of FIG. 12 stores, as a minimum, cross-referenced entry and exit points for audio sections, with these needing to have correct alignment timing if these are to be spliced seamlessly together. In fact, matching criteria needs to be fulfilled before edit points are calculated. Beats are calculated from onset detection (beat detection), fractions are calculated by evenly dividing the time between beats "Actual entry/exit" and "abstract entry/exit" do not coincide with "abstract fraction positions" and "actual detected beats"; there is no such relationship FIG. 10 is a timing diagram 250 showing relative timing between different time signatures 252, 254 in different sections of, for example, a music track. For example, the time signature in a first audio section may be compound 6/8 time, whereas the timing in a second audio section may be simple 4/4 time. Due to the discrepancy between timing signatures, it is necessary for the system of a preferred embodiment to assess whether, in fact, a recorded displacement (expressed in terms of beats and fractions) between exit and entry points actually corresponds. In other words, cutting between sections must take into account varying time signatures between sections.

This assessment is achieved by establishing a third time base of pulses that have a length dependent upon a lowest common multiple of fractions within respective bars for different sections, with the bars of the respective sections then partitioned into an equal number of fixed length pulses. The number of pulses in a fraction can therefore differ between fractions of different sections. The system therefore applies a coefficient to align different time signatures, with this coefficient being a ratio between pulses within the different sections.

In the example of FIG. 10, in compound 6/8 time there would be six fractions between adjacent beats. In simple 4/4 time, there would be four fractions between adjacent beats. A resulting lowest common multiple for the product therefore provides a pulse count of six. Consequently, following correlation, a coefficient of 1.5 identifies a cut point (related to a suitable anacrusis) to be present in Bar X, beat 1, quaver 2, fraction 2 of the compound time (in this example), but at Bar Y, beat 3, fraction 3 of the simple time.

The multiplication coefficient results in the time anacrusis in one time signature being interchangeable with others, which may be complex.

Expressly FIG. 10 technically but from a musically perspective:

The simple time signature is 4/4/16. The 4/4 notation is standard, whilst the 16 means semiquaver fractions; hence, four semiquaver fractions are present in a crotchet beat. The actual exit for the simple time signature of 4/4/16 is minus one beat and minus two 2 fractions from the end of the bar. The end of the bar, in this case, corresponds to the abstract exit.

The compound time signature is 6/8/16. The 6/8 means there are 2 beats of a dotted crotchet each in a bar. This means there are three quavers in each beat, compared to the simple time signature in which there are only quavers. Likewise, there are six fractions of 16ths compared to four fractions of 16ths.

In this FIG. 10 example, this means that to edit half-way through a beat, one needs to multiply by 1.5 the number of fractions to make the equivalent edit in a 6/8 bar from a 4/4 bar. Hence, to line up the edit point in between the beat, the simple time signature exit is multiplied by 1.5, or conversely, the compound time signature lowest component is divided by 1.5. This means that a grid of $24^{th}$ pulses, of which a $16^{th}$ in the simple time equals three pulses, and the $16^{th}$ in the compound time equals two pulses. The system is therefore able to measure all entries and exits in such pulses and multiply the number by the given coefficient related to the time signature. It is noted that the $24^{th}$ pulses are valid in this example, but may be different in other situations with other time signatures. In practice, the system intelligence says: 'I have a simple time exit at minus one beat and minus two fractions, so therefore −4−2=−6 fractions of 16ths. This gives eighteen pulses and provides three pulses per fraction. For complex time, the pre-calculated exit occurs at minus one beat, minus one quaver, minus one fraction. Therefore, −6−2−1=−9 fractions of 16ths, with this giving eighteen pulses and providing three pulses per fraction, but divided by the compound coefficient of 1.5. Since both are both now normalized to an eighteen-pulse length, an exit to this entry exits.

The section assembly intelligence 352 is configured to undertake analysis of any supplied briefing note input, uploaded or otherwise entered by the user through a user-interface. The section assembly intelligence 352 operates to identify and calculate music segments required to fulfil the briefing note, with the identification based on the section-related metadata. The briefing note may be dynamically updateable during the output of a track to reflect changes in user-notified requirements.

Available audio sections 562 are then made available 568 for full sequencing in a sequencer 570 that, preferably, is based on AI logic. The sequencer 570, which is typically implemented programmatically, is configured to select and align appropriate audio segments with corresponding events. Sequencing is based on correlation of the tag placed in the metadata of the audio section with the briefing element, i.e. the Mashtraxx vocabulary word, assigned to each part of the external event that is to be audibly-augmented.

Functionally, the sequencer 570 is configured or arranged to identify and match the music interval or function 572; this is required for a seamless transition between audio sections. Additionally, the sequencer 570 operates to match entry and exit points 574 between different identified themes, wherein an audio section of a first theme is being played and an audio section of a second theme is to be cut into the first theme as the first theme is faded out (rapidly). Again, this is required for a seamless transition between audio sections. Finally, the sequencer 570 matches music timing 576. These functional can be based on music information retrieval "MIR" algorithms (such as those indicated above), although inefficiencies or erroneous automated analysis in MIR evaluations are addressed through the provision of an interface providing a user with the ability to input, overwrite or otherwise define tags applied in the audio section metadata to define the audio/music section theme. Again, this is required for a seamless transition between audio sections. The definition of a segment, as previously indicated, is made in terms of perceived properties to a listener/user and/or quantitatively and/or qualitatively parameters (measured through MIR software) of the audio within the particular section.

The "theme" may be represented in a binary-coded form or a word-based natural language that includes more or less information than the example provided immediately above. For example, user-defined heuristics can be used to provide greater granularity and definition to the briefing note and therefore a more directed selection and assemblage of audio segments. Heuristics may relate, for example, to i) song sequence and therefore the degree of re-ordering of the resulting audio output relative to the ordering of verses and choruses in the original song or soundtrack, ii) segment uniqueness, e.g. an indication on the amount or permissibility of repeated segments, and iii) loop points that establish a point for a "fill" required to lengthen a particular audio segment.

In the limit, the metadata tag for the audio segment could simply be a word that correlates to the Mashtraxx vocabulary used to define the characterization of the current and ongoing external event 312.

An audio generator 580 (of FIG. 5) is coupled to the sequencer 570. The audio generator 80 is configured to manage crossfading 82 between an active audio segment currently being played and a destination segment that is the next scheduled and selected audio segment to be played when the external event changes. This function includes identification of an appropriate transition associated with an anacrusis (alternatively and interchangeably referred to as a "pickup" or "onset"), e.g. a note or sequence of notes which precedes the first downbeat in a bar of music. In terms of the embodiments, the onset—such as a downbeat—is important in that its omission or mistiming can be discerned and representative of an unnatural break in audio, whereas its presence provides continuity and flow. The arrangements therefore splice between current audio segments and subsequent audio segments at an anacrusis immediately before an earliest onset in either the currently active track or the destination track, thereby allowing different audio segments conveying different themes to be matched together. The system therefore operates to pin and document an anacrusis to an appropriate point in an audio segment.

The audio generator 580 preferably includes a buffering function 584 to smooth audio transmissions and minimize delays. As its output 586, the audio generator 580 can either stream 88 the assembled audio segment or send the audio segment to a file 590 (which may be part of media file 108 of FIG. 2).

Figure 6:
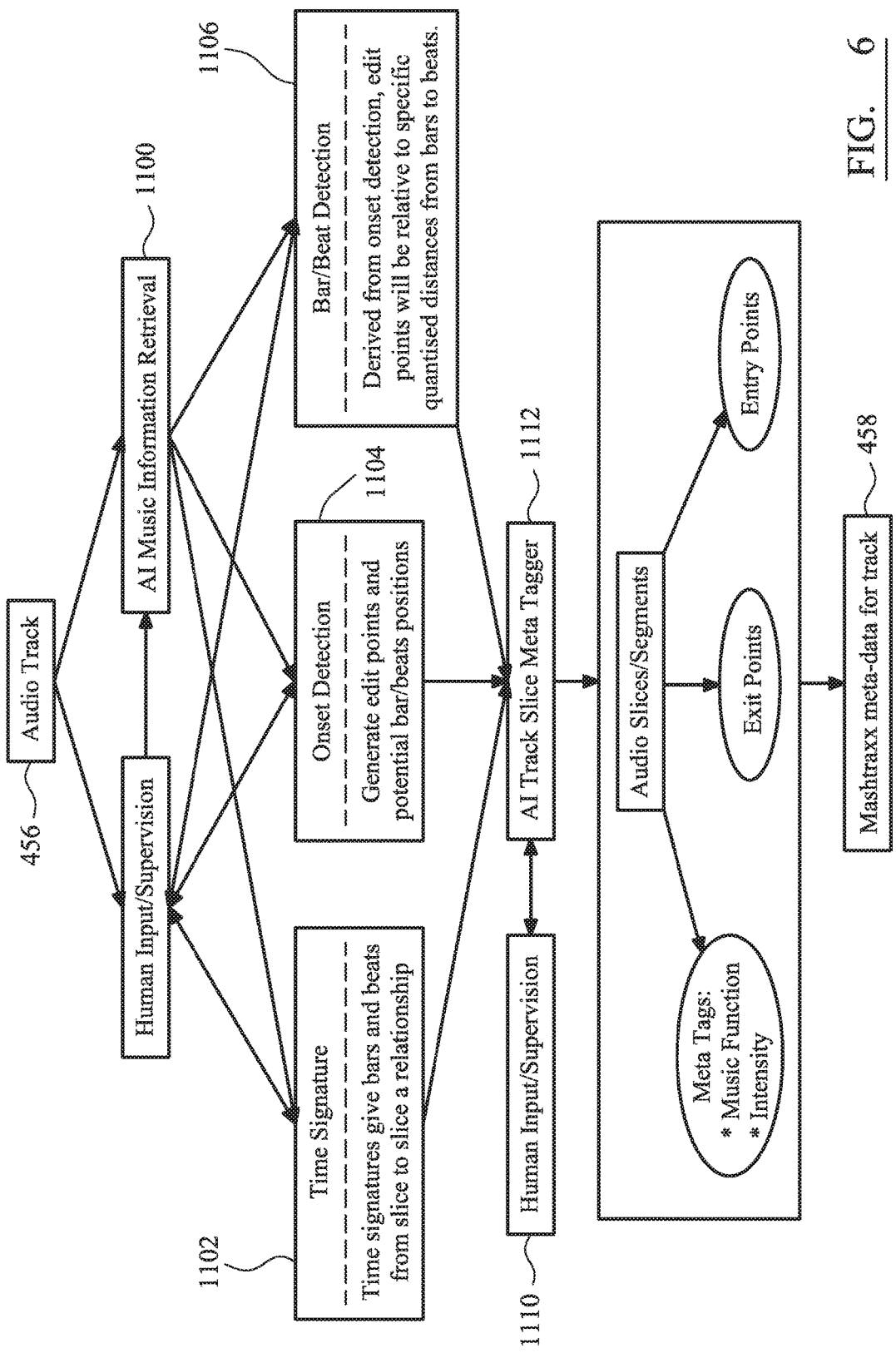
FIG. 6 is a functional diagram for track assembly and metadata creation in accordance with a preferred creation process.

FIG. 6 is a functional diagram for track assembly and metadata creation in accordance with a preferred creation process. FIG. 6 therefore represents the processes applied, for example, to an original musical track 456 to create a composite media file (reference numeral 454 of FIG. 4) containing Mashtraxx metadata for the original musical track 456.

Figure 5:
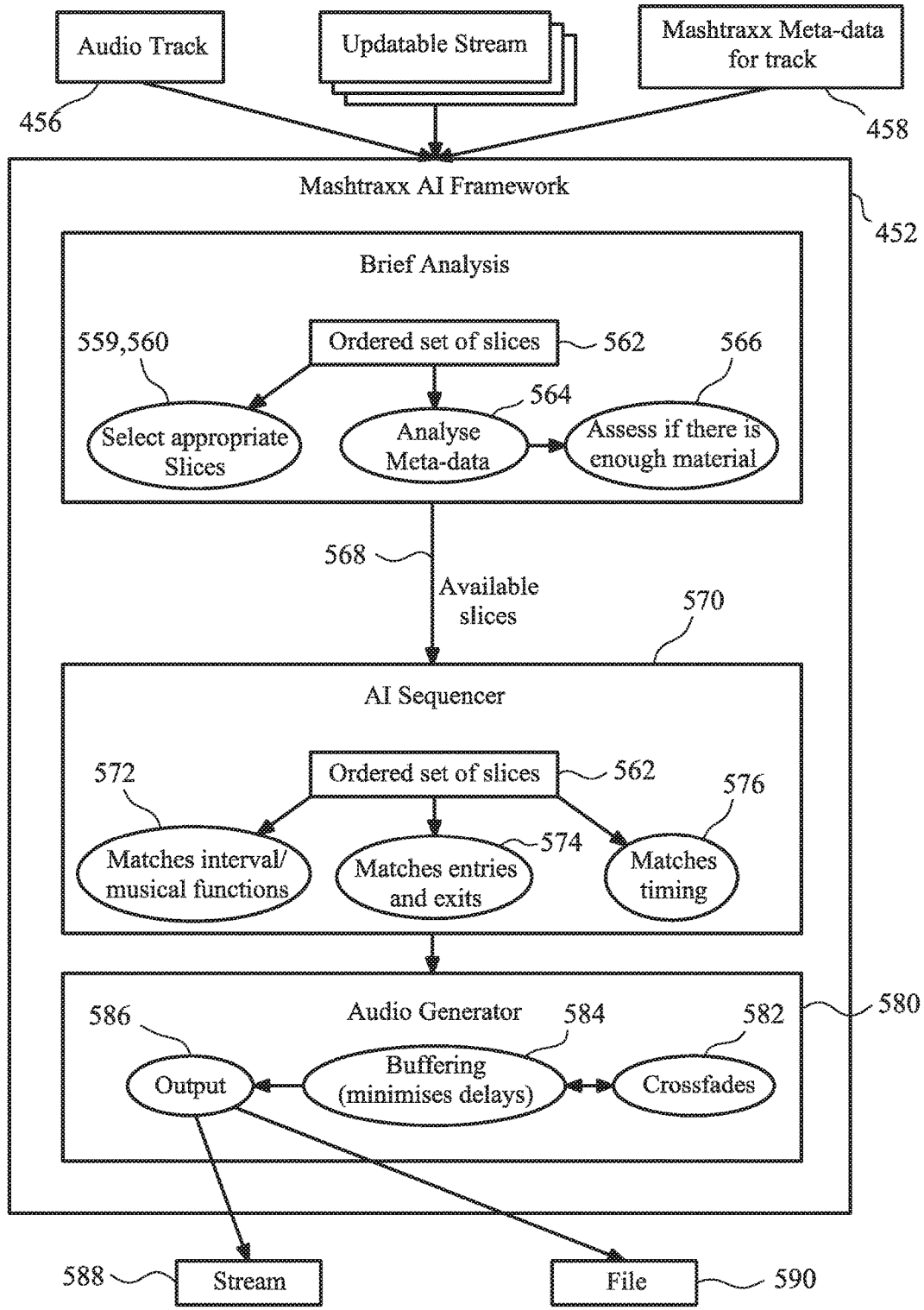
FIG. 5 is a functional diagram of section assembly intelligence employed within the system of FIG. 4.

For an audio track uploaded or made available to the system of FIG. 5, the audio track is subjected to AI-based MIR algorithms, as previously indicated. Through a preferred provision of a GUI, human review of the audio track's spectral composition, time signature(s) 1102, including tempo, and other significant musical events may be input to define or refine (further) themes and audio segments. This human-based process, whilst merely preferred, can therefore address deficiency or errors associated with automatic interpretation of the audio track's characterization. For example, the start point of a desired signal envelope for an audio segment can be adjusted manually through a GUI so as to align more precisely the start of audio data sampling with the commencement of a particular musical event (and thus an identified theme relevant to the external event that is to be augmented by the process as described herein).

Analysis of the time signature(s) provides a determination of bars and beats and, furthermore, variation of these as they occur between samples that make up the selected audio sections. This analysis provides the basis for the described mechanism (of the preferred embodiment) for seamless integration of one section to another regardless of differing time signatures and anacrusis.

Additionally, within each audio section, the system is configured to detect 1104 onsets at different points. Cutting between source, i.e. an active playing slice, and a destination slice, i.e. the audio segment that has been selected to be the next played in order to change the audio theme, will be described in more detail below and with reference to FIG. 7, whilst FIG. 11 shows a preferred process by which an onset can be determined.

Onset determination explained with respect to FIG. 11 can be implemented independently of other aspects as described herein, although its inclusion in the system provides a comprehensive solution. A musical onset is the point in time at which a musical (or other significant audible) event begins.

Figure 11A:
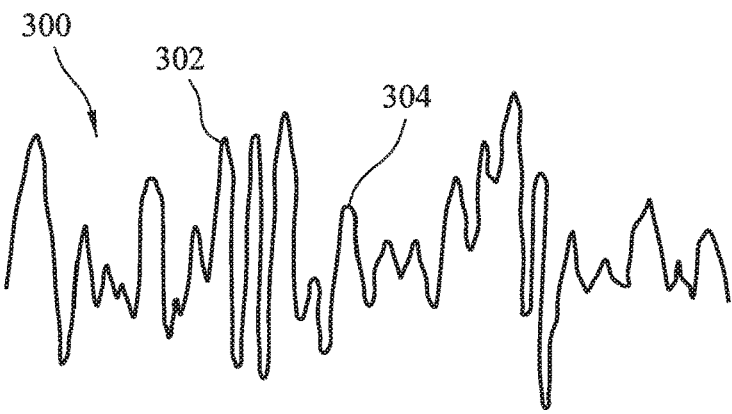
FIG. 11, composed of FIGS. 11a to 11d, shows a preferred process by which an onset is determined, the process employed by the preferred system in undertaking the cross-fade or cut exemplified in FIGS. 8a to 8c.
Figure 11B:
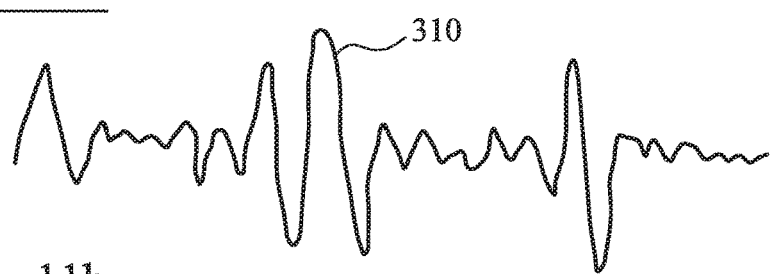
Figure 11C:
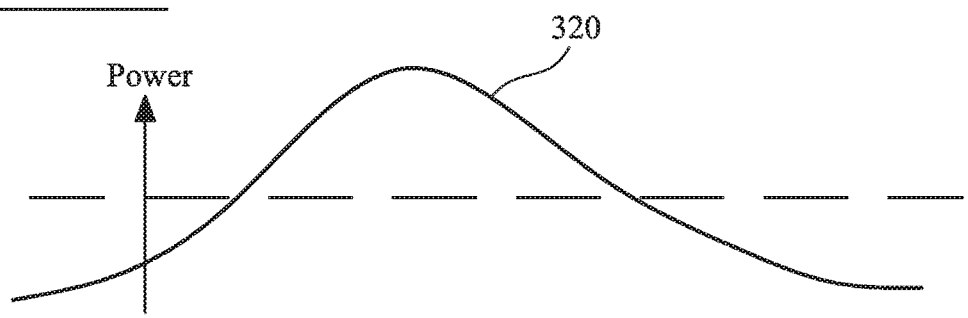

In FIG. 11a, a typical audio signal 1300 is shown to comprise components 1302, 1304 of varying amplitude. For onset detection, a preferred embodiment firstly separates the transient part (i.e. quickly evolving aspects of the audio signal, i.e. frequencies that demonstrate significant changes in energy in contiguous sampling windows where each sampling window has a duration of less than about fifty milliseconds) from the stationary part (i.e. stable aspects of the audio signal, particularly frequencies that appear across consecutive sampling windows) of the audio signal 1300; this produces a time domain representation 1310 as shown in FIG. 11b. Transients are more usually associated with higher frequencies and where these higher frequencies demonstrate significant increases in energy. An amplitude envelope 1320 of the transient part is then determined; this is typically based on a convolution function as will be understood by the skilled addressee in audio signal processing.

Subsequently, relative to a power threshold 1330, peaks in the amplitude envelope 1320 are detected. Peaks correspond to maximum points of the envelope in a localised region. Then, to attain the exact position of the onset, the system is configured to work through the transient signal from the peak backwards in time (on a sample-by-sample basis) to find the point X at which a characteristic of a period of the signal before that point X is maximally different from that same characteristic of a period of the signal after that point X. Backwards iteration from a localized peak will occur over, perhaps, up to seventy milliseconds or to a previous localized peak (if this happens sooner) having a power above the predetermined threshold. For adjacent peaks having powers above the threshold, an onset will necessarily be present between these peaks at the maximum difference.

Figure 11D:
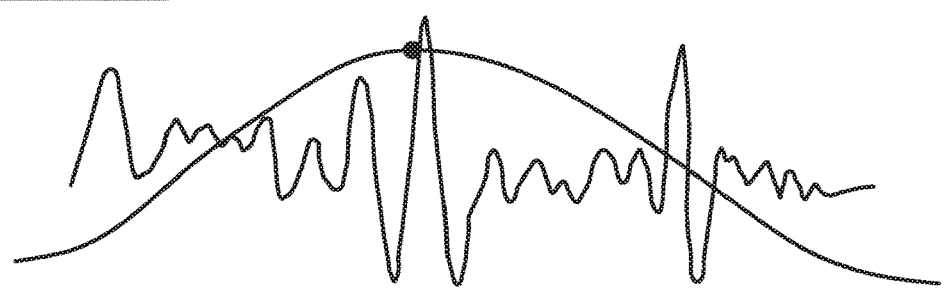

Characteristics include, but are not limited to, the standard deviation of the first derivative of the transient signal before and after the point X. In other words, the biggest ratio in adjacent powers as sampled over the sampling window provides the most appropriate point for the onset; this is illustrated in FIG. 11d. The transient envelope relates to all transients over the entirety of the audio track, with the generated amplitude envelope containing many sampling windows with peaks over the power threshold and thus many onsets that require determination. Expressly this differently again, an onset start is detected by preferably looking to identify the sampling point where the standard deviation of the rate of change of an identified measurable characteristic over a predetermined period before that sampling point is maximally different to that stipulated measurable characteristic as measured/determined after the point sampling point over the same predetermined period (which is typically about ten milliseconds, assuming a typical sampling rate of 44.1 k).

Sampling periods/windows may be in the region of about ten milliseconds to about fifty milliseconds. As an example of an onset, a cymbal crash is likely to represent an onset given that it is likely to have a maximum change in transients at the point of its occurrence in the audio signal.

Returning again to FIG. 6 and the process for generating track metadata, further automated track analysis (which again may be reviewed in light of manual input) functions to resolve bar/beat position 1106. Given the relationship between level and thus onset, bar and beat detection can be derived from or based on onset detection 1104.

With respect to the ongoing signal processing within the system, the time signatures analysis 1102, onset detection 1104 and bar/beat detection 1106 (as well as any supervised input from a user 1110) is used to slice or segment the audio track into themes—of varying duration—that correlate to the Mashtraxx vocabulary applied to categorize the nature of the external event and thus the nature of audio enhancement. In this respect, a metatagger 1112, preferably realized using AI logic—compiles an enhanced audio track 458 that includes metadata tags for selected audio sections. As indicated or inferred, this metadata identifies at least musical function and intensity as well as exit and entry points for cuts and fades for the themes associated with the section. The metadata tagging means that a sampled and delivered audio frame, i.e. a slice or segment, can be made to coincide precisely with timing of an identified external event 312, such as a identified by surpassing of triggering threshold or identification of a theme from an assigned Mashtraxx vocabulary word.

Time signatures or timeline generation allows the track sections to be described in musical notation, which is essential for correct matching of the track sections. Accurate identification of the time signature allows for a moveable timeline that supports automatic snapping to the closest beat.

The system generates a timeline preferably created in beats and bars for a digital audio track, ensuring that a musically faithful notation is preserved for the editing process. It is this that underpins the successful cutting, splicing and remixing of content in such a way that it is not detrimental to the musical integrity of the piece. System intelligence allows the construction of a flexible approach that can adapt according to the audio input that is to be modified. For example, if a decrease in tempo is detected then the timeline can be adjusted accordingly. This is important in the deconstruction of musical forms for the purpose of remixing and re-editing. It supports a tangible understanding of how the audio relates musically to the timeline and allows the user to maintain a real sense of musical structure within a digital format.

Audio section creation is therefore the process of dividing up a track into sections which can be rearranged to form a new composition. Preferably, sections are automatically snapped to bars. Each section can belong to a group that may be user definable, but preferably default to one of an intro, a verse, bridge, chorus, Middle 8 or outro (as identified by the metatag). Each section allows customisable metadata properties, including but not limited to intensity, musical function, instruments, vocals and tags.

The system described herein makes use of software to maintain traditional compositional rhythmic analysis in terms of bars, beats and fractions of bars. This allows the user to engage in splitting and understanding bar and beat compositions in a traditional fashion. This will maintain the compositional intuition, making the deconstruction and rearrangement of ideas musically straightforward. The system also incorporates pulse data, exploiting the full potential of digital audio, enabling the smallest compositional fraction to be split into further pulses. The main function of the pulses is to offer the smallest granularity necessary to cope with different time signatures and coefficients used to cut between different time signatures in different sections.

Metadata for a complete track therefore contains a set of audio section descriptions as well as an explanation as to how they can be transitioned to or from any other section. Each audio section therefore includes comprehensive metadata allowing a slice sequence to be constructed given a user brief correlating to a characterization of an external event. Optionally, the metadata may contain a reference to the original audio track, enabling the correct track to be located from an online music library, such as Spotify. This allows the metadata to be stored independently of the original track and for both the metadata and track to be streamed or pulled down by the section assembly intelligence 452.

The metadata framework therefore allows for tagging of music according to certain user-defined categories. For example, these categories could include; for example, genre, mood, style and tempo and could be used to create a database of sound that is searchable. In effect, the system yields the potential to search for music not only by title and artist, but by sound, genre and musical style. The database configuration of FIG. 12 therefore allows for searching of individual sections' metatags, and not just on a global approach to handing of metadata. For example, it is preferred that the meta tagging system can fulfil briefing requirements such as: "I'd like a track which is upbeat, happy lively, also it needs to have a trumpet solo at some point, and a chill out section with string beds somewhere else." Existing systems fail to provide such a richness and flexibility of searching.

Preferably, metadata schema not only allows data to be attributed to the whole track, but facilitates fine grained annotation of particular sections, thereby providing descriptive data of salient features of a piece of music. One or more (and typically multiple) applied musical characterizations are common to each piece of music, and therefore allow the AI mechanism to edit a digital audio file depending on synchronization requirements with identified incoming events (from the real world). The emotional metatags of the audio are therefore independent of characterizations applied to the theme of each section. Searching for different emotional moods will allow for different audio sections to be swapped out to fulfil synchronization requirements. Some key features therefore include musical hit points and function descriptors relating to:

Climax: Where the music hits a peak

Static section: the music neither increases nor decreases in perceived contextual and or actual level intensity Drama drop out: the music changes suddenly to become very sparse Drop down fade: the music gradually decreases in intensity Build: the music gradually increases in intensity Underscore: low level audio fill under dialogue and acting Genre Instrument type Every section of a piece of music can be described in terms of its form function, i.e. how the section operates within the totality of the piece, e.g. underscore, drop-out fade and build. Therefore, irrespective of the emotionally-related contextual metatags applied to a section, if the incoming event data can be described in terms of the described musical form functions then any piece of music can be used and will fulfil the synchronization requirements regardless of any emotional subjectively that arises with characterization of a particular piece by user. This is significant to the functionality of the described processing applied in the various embodiments.

Metatagging does not need to be limited to music, and could apply to other sound sources (such as the kicking of a football) so a sound stage can be augmented by an inserted audio section that is tagged to an identified external event.

Figure 7:
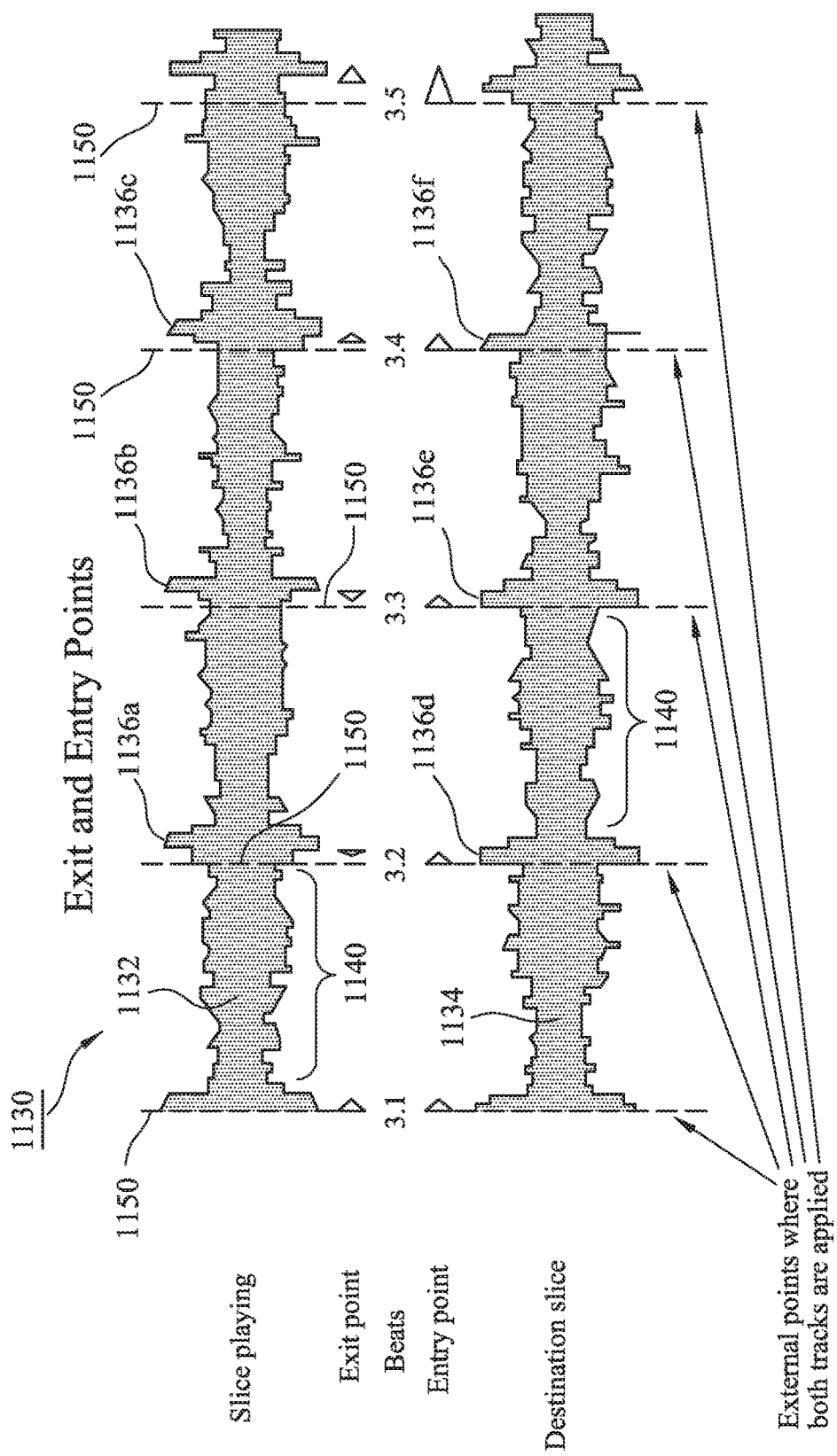
FIG. 7 is time domain representation of a preferred cut strategy between an exit point from and entry point to different musical themes within sections of audio.

FIG. 7 is time domain representation 1130 of a preferred cut strategy between an exit point from and entry point to different musical themes within track samples.

Within FIG. 7 there are two time domain spectral: a first active "playing" audio segment 1132 and a second "destination" audio segment 1134 that is used to introduce a change in theme and second segment which is to be cut into, i.e. to replace, the first active segment as a new correlated audio output. The preferred embodiment accomplishes this fade/cut in a near seamless fashion.

Both time domain spectra include common features, such as onsets 1136a-1136f.

In terms of a time signature or time base 1150, this is represented in the diagram of vertical dotted lines that partition the audio envelope into segments that may have a duration corresponding to a semiquaver, crochet of or some other selected timing. In FIG. 7, an exemplary representation provides for four fractions of a beat 3.1, 3.2, 3.3 and 3.4 that divide the relevant portion of each envelope into four equal time sectors. These four fractions may, in fact, represent a musical beat or multiple beats or some other period in the audio track.

Figure 8A:
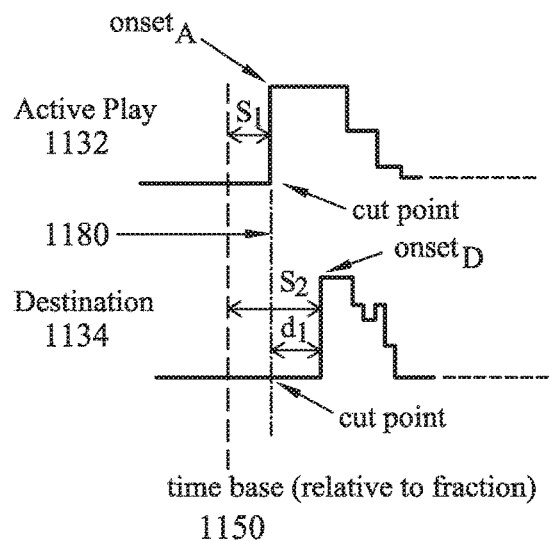
FIGS. 8a, 8b and 8c show a cross-fade or cut between active and destination audio sections relative to both a common time base and respective onset events, the cross-fade or cut in accordance with a preferred embodiment.
Figure 8B:
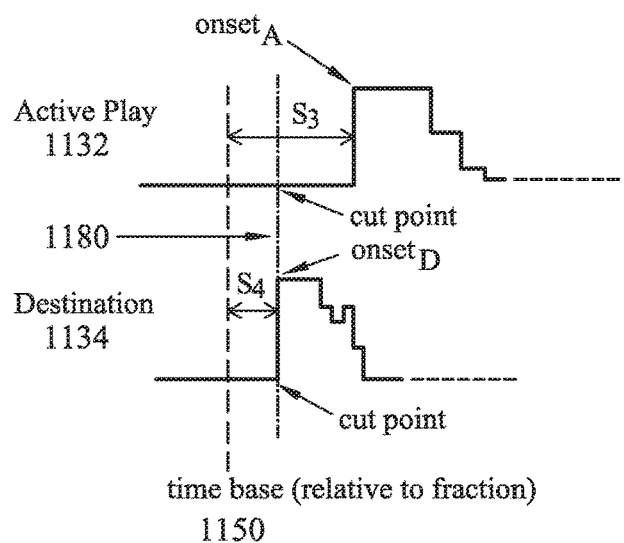
Figure 8C:
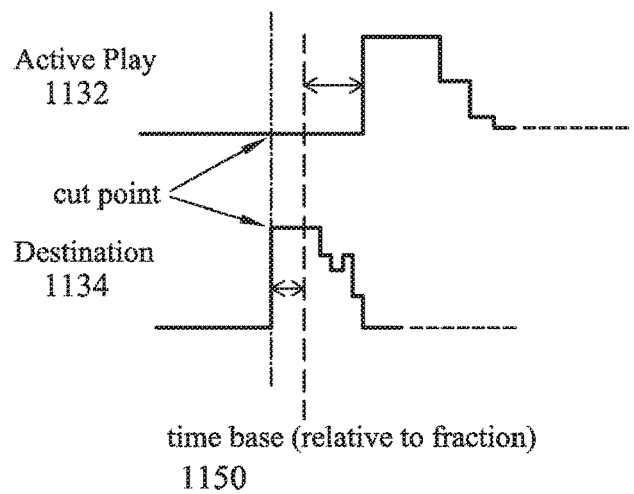

Referring to FIGS. 8a, 8b and 8c, in terms of the exit from the first active playing audio segment 1132 to the second destination audio segment 1134, the preferred fade/cut process firstly identifies and then contrasts the relative onsets in the first active playing audio segment onset$_A$ and second destination audio segment onset$_D$, with the assessment made relative to the nearest appropriate time base 1150. Having two onsets onset$_A$ and onset$_D$ played in close time proximity or an expected onset delayed significantly in time would cause a noticeable discontinuity in the fluidity of the audio and the transition between themes.

Consequently, when a theme transition is to take place, a preferred embodiment looks to the sampling time differences ($s_1$ relative to $s_2$ and $s_3$ relative to $s_4$) between the first onset (in each of the active and destination segments) and selects the earliest of the alternatives. Regardless of whether the onset occurs in the active playing track or the destination track, the earliest onset in time relative to the time base 1150 is the point when there's a cross fade—and preferably an instantaneous cut 1180—from the active playing section to the destination section. For cross-fading, a typical cross-fade may take up to about five milliseconds. Cross-fading is preferred to an instantaneous cut since it avoids the potential for an audio pop as the voltage in the two signals is unlikely to match. Unless a specific context requires a more limited interpretation, the term "cut" should be viewed as a special case cross-fading event that occurs more rapidly.

In FIG. 8a, the cut 1180 from the active audio section 1132 to the destination section 1134 is therefore triggered simultaneously with (or, if buffering is available, marginally before) the sample where the onset in the active audio section 1132 starts to rise. Destination audio track is then played out and becomes the active track until such time as another theme change is required. In FIG. 8b, the cut 1180 from the active audio section 1132 to the destination section 1134 is therefore triggered simultaneously with (or, if buffering is available, marginally before) the sample where the onset in the destination audio section 1132 starts to rise. Typically, sampling rates and time bases operate on fractions of a second, so an absolute cut (rather than a slower fade) is inconsequential and not substantially noticeable. The process therefore allows for the seamless and endless reconstruction of a piece of audio. Buffering is preferred since it provides for pre-processing.

In FIG. 8c, it is noted that the onset in the destination audio 1134 occurs before the time base 1150, whereas in the active play section the onset is detected as occurring after the time base. In FIG. 8c, cut and cross-fade is therefore timed with the detected onset in the destination section 1134, with buffering ensuring that its timing is maintained.

By separating the metadata from the original track and storing the metadata in a secure database, the system of the preferred embodiment optionally keeps the substance of the content invisible, thus protecting licencing and copyright issues. The separation process may therefore eliminate much of the access needed for P2P (Peer-to-Peer) sharing, since the content may be dynamically generated each time it is required. In fact, the system of the preferred embodiment may protect the original content, as well as the new content generated by user input and the syncing process.

The system and processes therefore supports creative editing through an automated process operable in real-time. As such, music for games can be dynamically edited to follow the story of the game: the highs and lows, achievements and failures. Since an in-game experience invariably varies, this means that intelligent framework 452 (of FIG. 2) can operate to stream music validated to an access key for each track to eliminate piracy for those users who do not possess a valid access key. Additionally, the use of metatagging of audio and correlation with real-world events permits a user to make use of their favourite music over, for example, a personal YouTube, Facebook and Vimeo video.

In summary, the innovation provides a method for editing digital audio information with music-like composition characteristics that enable real-time music synchronization. The system provides for onset detection as well as the identification of an anacrusis event in both an exit and entry audio section that provides for a seamless audible transition. This sophisticated system uses DSP and speciality AI algorithms to analyse raw audio data and perform editorial manipulations that previously have demanded expert knowledge and trained music professionals to execute. Furthermore, this adaptive system segments audio data, whilst simultaneously seeking to imbue a set of control codes that are easily adjusted to allow editorial change. The system serves to transform the musically significant parameters of digital audio information. While the waveform has become the standard representation and navigation interface for digital editing, it neglects traditional compositional rhythmic analysis in terms of bars and beats. This information is essential for the rearrangement and remixing of audio tracks, and is integral to automated synchronization. Furthermore, this system supports the encoding of additional descriptive metadata in the file format relating to the textures, trajectories and intensity of a given piece of music. There is currently no existing metadata format for capturing the narrative functions of a piece of music, and this will provide a structured way for doing this and a system for converting this high-level information into a low level transferable data format.

From the perspective of end-user functionality, the software is configured to allow end-users to provide descriptive data that will facilitate the automatic retrieval of a selection of tracks that are automatically remixed—by the section assembly intelligence 452—to fit to the scenario that requires musical accompaniment. End-users can provide guidance through the described access interfaces, which guidance can be based on the mood they want to create and even suggest a narrative they want the music to achieve. The system is preferably configured to reduce the information overload by retrieving only items that are estimated as relevant for the user, based on a simplistic input from the user, such as basic annotation of a piece of film data or information about the desired usage of the music. The system is configured to select relevant tracks based on global and intra-track specifications decided by an analyst or annotator, such as input and correlated to the external event through natural language or a Mashtraxx vocabulary word. Examples of this would be mood, general pace/speed of the music, key instruments (if they have any in mind) and genre.

The various embodiments and arrangements of the present invention therefore provide a methodology and related interacting network of components that can track use of an audio track playable on a client device connectable into a network having a server arranged to provide controlled access to a database in which is stored a plurality of uniquely identifiable source audio tracks. Generally, the source audio tracks include multiple musical sections that are categorized distinctly in terms of definable themes or absolute timings.

Content tracking begins, generally, with the making of a request to the server to permit the client device to access an identified/selected source audio track from the plurality of source audio tracks stored within a database to which the server has access. The server, operating as a gatekeeper, provides the client device with access to (e.g. download or streaming) the identified source audio track, with this access including making available to the client device a unique identifier related to the identified source audio track. The unique identifier is, as explained herein, typically embedded within the metadata of the track, so provision of the track inherently sees communication of the unique and related track identifier. At the client device, the app or browser interface instantiates functionality that can establish use of the identified source audio track at the client device, e.g. by tracking at least one of: entry and exit points associated with playing of at least one of said musical sections in the identified source audio track, and/or tracking how the identified source audio track was used, performed or manipulated at the client device. Tracking data (e.g. a log possibly realized as re-encoded metadata for the audio track) is assembled, by operation of processing at the client device for one or both of (a) those entry and exit points, and/or (b) how the identified source audio track was used, performed or manipulated at the client device. This tracking data is linked to the at least one unique identifier to allow subsequent server-side understanding of remote events. The client device is configured to send to the server, over the network, the tracking data (in a suitable form, as indicated herein) as well as the track identifier.

At the server, having regard to the tracking data and its link to the unique identifier, the server is configured to collate (for all tracks and/or all users of identified tracks), store and/or relay the tracking data related to use of at least a portion of the identified source audio track by the client device.

The server may also be arranged to resolve a responsibility for a payment for use of the identified source audio track by at least one of: a) the client device; and b) a media server coupled to the network and the client device, with which media server the client device interacts. This may culminate in direct invoicing and automatic debiting of a client account (if there's a registered pre-existing subscription service), or the invoicing of a social media platform should that platform support or administer the uploading and playing of this selected audio track.

The technical process of tracking additionally or alternatively supports a quantitative measure to be gauged [e.g. by a content owner] about how a track is searched for, how a track is downloaded, how a track is listened to in totality or by section, how a track is edited and/or how a track is output or attached to other media. This allows a content owner to gain an insight of the efficiency at each of these stages with respect to a particular track, allowing the content owner to refine either the granularity of the metadata and/or otherwise to adapt or improve any qualities that are identified as inefficient in the chain of quantitative assessment described. For example, quantitative analysis may allow for a change in pricing of the track given the nature of its rendering, the quality of the mastering of the audio and/or the compositional assembly of the track based on observed usage of particular (e.g. repeatedly played) sections of a specific audio track.

The uploaded tracking data can therefore be considered as information necessary to infer or directly report existence of at least one of: (i) a derivative work of the identified source audio track, wherein the derivative work was assembled by processing at the client device; (ii) synchronization of the identified source audio track with other media, wherein the synchronization was brought about by processing at the client device; and (iii) mechanical or electronic copying of the identified source audio track at the client device wherein the copying was initiated by processing at the client device; and/or (iv) general use of the track.

Whilst a preferred embodiment makes use of metadata that both codes for seamless transition points and identifies the source track, the user-driven content tracking approach as described herein can function based on receipt at the client device of the source track identity alone and then establishing use of the identified source audio track at that client device. The metadata communicated to the client device may therefore be of a more general nature (and not related to, for example, an optimum point for a seamless audible transition and precise cut-points for editing purposes). Rather, the downlink communicated metadata could be just the track identify or the track identifier, possibly with additional timing data related to the audio added to this basis track identify or track identifier. The present invention could, in fact, also be applied to a video compilation that is independent of any audio file, given that the video can also be edited locally at the user device and such editing reported by way of entry and exit points associated with playing of the video or how the identified source video was used, performed or manipulated at the client device.

Aspects of the present invention may be provided in a downloadable form or otherwise on a computer readable medium, such as a CD ROM, that contains program code that, when instantiated, executes the link embedding functionality at a web-server or the like. It will, of course, be appreciated that the above description has been given by way of example only and that modifications in detail may be made.

The method and system of identifying onsets, as especially described with respect to FIGS. 11a to 11d, may in fact find further and more applications beyond the synchronization of audio data to augment monitored events. The method and system may therefore be more generally applied to identifying onsets in any music or audio content file irrespective of whether or not the music is categorised in terms of a contextual theme (whether automatically sensed or set through a user or expert critique).

Although embodiments discuss the adaptation of audio to external events, the reverse holds true in that external events can be triggered or shaped by the audio metadata. For example, an external event may be a video transition occurring between contiguous scenes in a film or a new phase within a level of a computer game (such as when new characters arrive or when new abilities are acquired and first presented to the game player during game play). Based on an understanding of (for example) one or more of intensities, sections, bars, beats and fractions of a beat determined in the context of the preferred embodiments, the audio metadata derived from the various preferred embodiments can be used to drive a change in the observed temporal property of the events as experienced, e.g. lights flashing or props moving within a live stage performance or within a CGI environment or a recorded video.

Whilst a preferred embodiment has been explained, particularly, in the context of an editable track, it will be understood that the present invention may apply directly to an annotated original audio track that has seen its various sections characterised in terms of musical compatibility. In other words, the system of FIG. 2 is applicable to a track that has been catagorized with a Mashtraxx audio file description that permits, upon download and data processing, a seamless client-side edit (irrespective of whether the track has actually undergone an edit and subsequent upload). The seamless cross-fade facility is therefore subordinate to the client-side approach of reporting on specifically identified use of sections of audio taken from an audio or multimedia source. By extension, the client-side reporting of use of a section of content associated with a unique track identifier and related timings of an entry or exit point can also be used for content tracking, reporting and proportioned billing for use of specific sections of content by a distributed network on many subscribers.

It is further recognized that an association to a track can be established from use of a dedicated point-to-point communication channel or a unique identity for a communication session. Provided that the bi-directional communication of information, i.e. communication of the source track in a downlink direction from the [gatekeeping] server to the client device and reporting data in the uplink from the client device to the server, makes use of an assigned but dedicated channel and/or the unique identity of the communication session then the unique track identifier can be considered as potentially redundant. In other words, once the client device has selected the source track and the server is aware of this selection, use of a dedicated channel operates in effectively the same way as the preferred track identifier in that system intelligence at the server is able to resolve use by the client device of the selected track through recognition that a direct association exists between (a) access to and use of the audio track at the client device and (b) the assigned dedicated channel(s) and/or communication session(s) over which access to the audio track is provided and reports of local client-determined use are sent. The protocol "WebSocket" is an example of a point-to-point communication session that could support such handshaking and direct associations and thus to establish an association with a specifically-selected audio track that is accessed through the server and then manipulated or rendered locally at the client device. The term "unique identifier" (or the like, including "unique track identifier") should therefore be understood, as the context requires, to be one or both of a piece of encoded metadata associated with the track and/or a dedicated communication link associated with access to a specifically selected piece of audio (in a database accessible).

The mechanism of content tracking, although described in the exemplary context of audio tracks and their use and editing, can be applied more generally to tracking use of selected source, i.e. original, digital media files that are downloaded, used and manipulated. These digital media files may include multimedia files and video content stored remotely on a database accessible upon request by a client device wishing to subscribe to access to the database of multimedia content.

As used in this application, the terms "component", "module", "system", "terminal", "server", "user/subscriber equipment/device" and the like are intended to refer to a computer-related entity, either hardware, firmware, a combination of hardware and software, software, or software in execution. For example, a component can be, but is not limited to being, a process running on a processor (or interchangeably a "controller"), a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented, unless a specific order is expressly described or is logically required.

Moreover, various aspects or features described herein can be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media, such as databases and memories, described herein can represent one or more devices and/or other computer-readable media for storing information. The term "computer-readable medium" may include, without being limited to, optical, magnetic, electronic, electro-magnetic and various other tangible media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application while remaining, either literally or equivalently, within the scope of the accompanying claims.

Unless specific arrangements are mutually exclusive with one another, the various embodiments described herein can be combined to enhance system functionality and/or to produce complementary functions in the effective delivery of sensory-relevant synchronized audio that, optionally. Such combinations will be readily appreciated by the skilled addressee given the totality of the foregoing description. Likewise, aspects of the preferred embodiments may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

The invention claimed is:

1. A method of tracking use of an audio track playable on a client device connectable into a network having a server providing controlled access to a first database in which is stored a plurality of source audio tracks comprising one or more musical sections, wherein the method comprises:
    making a request to the server to access an identified source audio track of the plurality of source audio tracks, the request for the identified source audio track being made by the client device;
    providing access to the identified source audio track to the client device, said access including making available to the client device a unique identifier related to the identified source audio track; and
    at the client device, establishing use of the identified source audio track at the client device by tracking at least one of:
        entry and exit points associated with playing of at least one of said musical sections in the identified source audio track, and
        how the identified source audio track was used, performed or manipulated at the client device;
    at the client device, generating tracking data for at least one of (a) entry and exit points, and (b) how the identified source audio track was used, performed or manipulated at the client device;
    sending, to the server over the network, a report of local use of at least a portion of the selected source audio track at the client device, the report associating the tracking data with the unique identifier to enable at least one of storing and relaying of tracking data related to use of at least a portion of the identified source audio track by the client device;
    wherein a second database stores associated audio file descriptions defining musically viable cross-fades or cuts between sections in each source audio track, each viable cross-fade or cut in each section defined by a point in real time corresponding to a point in musical time where an audibly seamless cross-fade maintains musical rhythm between entry and exit points of selected sections, wherein providing access to the source audio track includes at least sending an associated audio file description to the requesting client device; the method further comprising:
    at the requesting client device, using the associated audio file description to identify transition points in real time for a succession of cross-fades or cuts between at least some of the sections in the source audio track, each of said transition points corresponding to a point in musical time that realizes an audibly seamless transition;
    sending, to the server, the transition points for the identified source audio track and the unique track identifier of the source audio track; and
    resolving, at the server, specific musical sections of the source audio track identified by the transition points and the unique track identifier to allow reporting of use of the specific musical sections.

2. The method of claim 1, wherein the tracking data infers or reports existence of at least one of:
    i) a derivative work of the identified source audio track, wherein the derivative work was assembled by processing at the client device;
    ii) synchronization of the identified source audio track with other media, wherein the synchronization was brought about by processing at the client device; and
    iii) mechanical or electronic copying of the identified source audio track at the client device wherein the copying was initiated by processing at the client device.

3. The method of claim 1, wherein the second database further stores an uploaded file associated with each of at least some of the plurality of source audio tracks, each uploaded file defining an edit of its respective source audio file, wherein the uploaded file allows selection of an order of sections within each source audio track when said uploaded file is read and the uploaded filed as accessible by the client device.

4. The method of tracking use in accordance with claim 1, further comprising:
    at the server, in response to resolving the specific musical section, identifying and then causing communication of targeted information to the requesting client device, the targeted information pre-identified as relevant to the source audio track or the specific musical sections.

5. The method of tracking use in accordance with claim 1, wherein the transition points for the identified source audio track are stored in a database, by the server, as a representation of the edit of the source audio track.

6. The method of tracking use in accordance with claim 5, further comprising:
making the representation of the edit of the source audio track available by providing access to the transition points to client devices to allow the edit to be played.

7. The method of tracking use in accordance with claim 6, wherein the transition points are embedded as metadata in an audio track.

8. The method of tracking use in accordance with claim 1, wherein the transition points are real-time values.

9. The method of tracking use in accordance with claim 8, wherein the real-time values are a pulse count within the source audio track.

10. The method of tracking use in accordance claim 1, wherein the identified source audio track is selected from the group comprising: a downloaded track; and a streamed file to the requesting client device.

11. The method of claim 1, wherein at least some sections of the source audio track form part of a multimedia file containing at least one image synchronized for display with at least one selected section.

12. A system for tracking use of a digital audio file, the system comprising:
a server configured to provide controlled access to a plurality of source digital audio files each containing at least one or more musical sections wherein, in response to a request received from a client device for access to an identified source audio track of the plurality of source digital audio files, to provide the client device with access to the identified source audio track the server being further configured to:
provide to the client device a unique identifier related to said identified source audio track to which access has been provided;
receive from the client device tracking data that is linked to the unique identifier, said tracking data relating to at least one of:
entry and exit points associated with playing, at the client device, of at least one of said musical sections in the identified source audio track, and how the identified source audio track was used, performed or manipulated at the client device; and
track use of the identified source audio track by storing or relaying the tracking data linked to the unique identifier of the identified source audio track requested by the client device, said tracking data related to use of at least a portion of the identified source audio track by the client device;
wherein the server is further configured to:
provide client devices with access to a database in which is stored associated audio file descriptions defining musically viable cross-fades or cuts between sections in each source audio track, each viable cross-fade or cut in each section being defined by a point in real time corresponding to a point in musical time where an audibly seamless cross-fade maintains musical rhythm between entry and exit points of selected sections;
send associated audio file description to the requesting client device, the audio file description relating to the source audio track;

receive, from the client device to which the associated audio file description was sent, transition points referenced with the unique identifier of the source audio track, said transition points identify in real time a succession of cross-fades or cuts between at least some of the sections in the source audio track, each of said transition points corresponding to a point in musical time that realizes an audibly seamless transition; and
resolve specific musical sections of the source audio track identified by the transition points and the unique track identifier to allow reporting of use of the specific musical sections.

13. The system of claim 12, wherein the server is further configured to, in response to resolving the specific musical section, identify and then cause communication of targeted information that is pre-identified as relevant to the source audio track or the specific musical sections and which targeted information is stored in a database.

14. The system of claim 13, wherein the server is further configured to store, in a database as representation of an edit of the source audio track, the transition points for the identified source audio track.

15. The system of claim 14, wherein the server is further configured to make the representation of the edit of the source audio track available to client devices by providing access to the transition points to client devices to allow the edit to be played.

16. The system of claim 12, wherein the tracking data infers or reports existence of at least one of:
i) a derivative work of the identified source audio track, wherein the derivative work was assembled by processing at the client device;
ii) synchronization of the identified source audio track with other media, wherein the synchronization was brought about by processing at the client device; and
iii) mechanical or electronic copying of the identified source audio track at the client device wherein the copying was initiated by processing at the client device.

17. The system of claim 12, wherein the server is further configured to resolve a responsibility for a payment for use of the identified source audio track by at least one of:
a) the client device; and
b) a media server, coupled to network and the client device, with which media server the client device interacts.

18. The system of claim 17, wherein the media server is within a social media platform.

19. A method of playing media content on a client device and tracking use of sections of media content, the method comprising:
selecting, from a database containing a multiplicity of digital media files each having one or more sections, a selected digital media file;
receiving, over a communications network, access to the selected digital media file and further receiving a unique identifier related to the selected digital media file;
establishing use of the selected digital media file at the client device by tracking at least one of:
entry and exit points associated with playing of at least one section of the selected digital media file, and how the selected digital media file was used, performed or manipulated at the client device;
generating tracking data for one or both of (a) those entry or exit points, and/or (b) how the selected digital media file was used, performed or manipulated at the client device;

communicating, over the communications network, a report of local use of at least a portion of the selected digital media file at the client device, the report associating the tracking data with the unique identifier;

receiving an associated file description for the selected digital media file, the file description defining viable cross-fades between sections in the selected digital media file, and using the associated file description to identify transition points in real time for a succession of cross-fades between at least some selected ones of a plurality of sections in the selected digital media file; and sending uplink, over the network, the transition points for the selected digital media file and the unique identifier to allow reporting of use of specific sections.

20. The method of playing media content on a client device and tracking use of sections of media content as recited in claim 19, wherein each viable cross fade is defined by a point in real time corresponding to a point in musical time where an audible seamless cross fade can be executed to maintain musical rhythm between entry and exit points within selected sections of the selected digital media file, and wherein the method further comprises:

using the associated audio file description to identify transition points in real time for a succession of cross-fades between at least some selected ones of a plurality of audio sections in the selected digital media file, each of said transition points corresponding to a point in musical time that realizes an audibly seamless transition; and sending uplink, over the network, the transition points for the selected digital media file and the unique identifier to allow reporting of use of specific sections.

21. The method of playing media content on a client device and tracking use of sections of media content as recited in claim 20, further comprising:

editing the selected digital media file by changing an order of audio sections therein.

22. The method of playing media content on a client device and tracking use of sections of media content as recited in claim 20, further comprising:

restricting an ability to select sections of a source audio track to only those sections that can be cross-faded contiguously together in the edit to maintain musical rhythm between entry and exit points within musically compatible sections of the source audio track.

23. The method of playing media content on a client device and tracking use of sections of media content as recited in claim 19, wherein the selected digital audio file is either downloaded as a file or streamed.

24. The method of playing media content on a client device and tracking use of sections of media content as recited in claim 20, further comprising:

accessing an edited version of the source audio track through a server; and playing the edited version by accessing, via the server, stored metadata associated with the edit, wherein the metadata defines transition points to allow the edited version to be played on the client device.

25. The method of playing media content on a client device and tracking use of sections of media content as recited in claim 19, wherein the selected digital media file includes at least some sections of a source audio track and wherein the selected digital media file is a multimedia file containing at least one image synchronized for display on the client device with at least one selected section of the source audio track.

26. The method of playing an audio track on a client device and tracking use of musical sections of that audio track as claimed in claim 19, wherein the tracking data infers or reports existence of at least one of:

i) a derivative work of an identified source audio track, wherein the derivative work was assembled by processing at the client device;

ii) synchronization of an identified source audio track with other media, wherein the synchronization was brought about by processing at the client device; and iii) mechanical or electronic copying of an identified source audio track at the client device wherein the copying was initiated by processing at the client device.

* * * * *